United States Patent
Chuang et al.

(10) Patent No.: US 9,189,081 B2
(45) Date of Patent: Nov. 17, 2015

(54) OPTICAL SENSING APPARATUS AND METHOD FOR DETECTING OBJECT NEAR OPTICAL SENSING APPARATUS

(71) Applicant: EMINENT ELECTRONIC TECHNOLOGY CORP. LTD., Hsinchu (TW)

(72) Inventors: Cheng-Ta Chuang, New Taipei (TW); Tom Chang, Taipei (TW)

(73) Assignee: EMINENT ELECTRONIC TECHNOLOGY CORP. LTD., Hsinchu Science Park, Hsinchu (TW)

( * ) Notice: Subject to any disclaimer, the term of this patent is extended or adjusted under 35 U.S.C. 154(b) by 198 days.

(21) Appl. No.: 14/106,876

(22) Filed: Dec. 16, 2013

(65) Prior Publication Data

US 2014/0166853 A1   Jun. 19, 2014

Related U.S. Application Data

(60) Provisional application No. 61/738,374, filed on Dec. 17, 2012.

(30) Foreign Application Priority Data

Dec. 6, 2013   (TW) .............................. 102144905 A

(51) Int. Cl.
*G06F 3/042* (2006.01)
*G06F 3/03* (2006.01)

(52) U.S. Cl.
CPC ............ *G06F 3/0304* (2013.01); *G06F 3/0428* (2013.01)

(58) Field of Classification Search
CPC .............................. G06F 3/0304; G06F 3/0428
USPC ....................................................... 250/206.1
See application file for complete search history.

(56) References Cited

U.S. PATENT DOCUMENTS

| | | | | |
|---|---|---|---|---|
| 8,830,210 B2 * | 9/2014 | Liao | ...................... | G06F 3/0428 178/18.09 |
| 8,937,612 B2 * | 1/2015 | Zhu | ...................... | G06F 3/0416 345/173 |
| 9,052,780 B2 * | 6/2015 | Lu | ...................... | G06F 3/0416 1/1 |
| 9,063,618 B2 * | 6/2015 | Machii | ...................... | G06F 3/0428 1/1 |

* cited by examiner

*Primary Examiner* — Seung C Sohn
(74) *Attorney, Agent, or Firm* — Winston Hsu; Scott Margo

(57) ABSTRACT

An optical sensing apparatus includes M light emitting devices, N sensing devices, a control circuit and a processing circuit. M is a positive integer, and N is an integer greater than or equal to 3. The control circuit is arranged for controlling activation and deactivation of the M light emitting devices, and controlling each sensing device to detect a reflected signal reflected from an object when a corresponding light emitting device is activated in order to generate a sensing result corresponding to the sensing device. The N sensing devices generate N sensing results in response to the M light emitting devices. The processing circuit is arranged for calculating position information of the object according to at least the N sensing results and N sensing positions of the N sensing devices, wherein the N sensing positions define at least one geometric plane.

31 Claims, 14 Drawing Sheets

9,189,081 B2

OPTICAL SENSING APPARATUS AND METHOD FOR DETECTING OBJECT NEAR OPTICAL SENSING APPARATUS

CROSS REFERENCE TO RELATED APPLICATIONS

This application claims the benefit of U.S. provisional application No. 61/738,374, filed on Dec. 17, 2012, the contents of which are incorporated herein by reference.

BACKGROUND OF THE INVENTION

1. Field of the Invention

The disclosed embodiments of the present invention relate to optical sensing, and more particularly, to a non-contact optical sensing apparatus, which uses a triangulation technique to obtain position information of an object, and a related non-contact optical sensing method.

2. Description of the Prior Art

With the advent of personal electronic products (e.g. a mobile phone or a personal computer (PC)), many control methods for human-device interaction have been popular. For example, an electronic mouse enables a user to trace a position on a screen and give instruction such as menu selection or editing contents on the screen. Regarding touch-screen sensor technologies (including capacitive, resistive, magnetic or surface acoustic wave types), the user can directly point to a position on the screen and move object (s) across the screen. In addition, some sensing devices (e.g. an air mouse or a three-dimensional (3D) mouse) allow the user to move them in the air to trace a position on the screen.

However, as none of the above control methods allows a bare hand or finger(s) to trace a screen position in a distance from the screen (i.e. without touching the screen), it is inconvenient for the user to trace a position on the screen in some circumstances. For example, when a user's hand is dirty from performing mechanic works, or greasy from handling the food, the user will prefer a non-contact method to track a screen position without touching the screen. In some other use case where the screen may be held in a distance away from the user, a contact touch method is not suitable for screen position tracking.

Thus, there is a need for a novel non-contact sensing mechanism to facilitate human-machine interaction.

SUMMARY OF THE INVENTION

It is therefore one objective of the present invention to provide a non-contact optical sensing apparatus, which uses a triangulation technique to obtain position information of an object, and a related non-contact optical sensing method to solve the above problems.

According to an embodiment of the present invention, an exemplary optical sensing apparatus is disclosed. The exemplary optical sensing apparatus comprises M light emitting devices, N sensing devices, a control circuit and a processing circuit. M is a positive integer, and N is an integer greater than or equal to 3. The control circuit is electrically connected to the M light emitting devices and the N sensing devices. The control circuit is arranged for controlling activation and deactivation of the M light emitting devices, and controlling each sensing device to detect a reflected signal reflected from an object when a corresponding light emitting device is activated in order to generate a sensing result corresponding to the sensing device, wherein the N sensing devices generate N sensing results in response to the M light emitting devices. The processing circuit is coupled to the control circuit and the N sensing devices, and is arranged for calculating position information of the object according to at least the N sensing results and N sensing positions of the N sensing devices. The N sensing positions define at least one geometric plane.

According to another embodiment of the present invention, an exemplary optical sensing apparatus is disclosed. The exemplary optical sensing apparatus comprises M light emitting devices, N sensing devices, a control circuit and a processing circuit. M is an integer greater than or equal to 3, and N is a positive integer. The control circuit is electrically connected to the M light emitting devices and the N sensing devices. The control circuit is arranged for controlling activation and deactivation of the M light emitting devices, and controlling each sensing device to detect a reflected signal reflected from an object when a corresponding light emitting device is activated in order to generate a sensing result corresponding to the light emitting device, wherein the N sensing devices generate M sensing results in response to the M light emitting devices, each of Q sensing results of the M sensing results corresponds to a sensing device and a light emitting device which are not adjacent, and Q is a positive integer. The processing circuit is coupled to the control circuit and the N sensing devices, and is arranged for calculating position information of the object according to Q emission positions of Q light emitting devices corresponding to the Q sensing results, N sensing positions of the N sensing devices and the M sensing results. M emission positions of the M light emitting devices define at least one geometric plane.

According to an embodiment of the present invention, an exemplary method for detecting an object near an optical sensing apparatus is disclosed. The optical sensing apparatus comprises M light emitting devices and N sensing devices. N sensing positions of the N sensing devices define at least one geometric plane. M is a positive integer, and N is a integer greater than or equal to 3. The exemplary method comprises the following steps: enabling each sensing device to detect a reflected signal reflected from an object when a corresponding light emitting device is activated in order to generate a sensing result corresponding to the sensing device, wherein the N sensing devices generate N sensing results in response to the M light emitting devices; and calculating position information of the object according to at least the N sensing positions and the N sensing results.

According to another embodiment of the present invention, an exemplary method for detecting an object near an optical sensing apparatus is disclosed. The optical sensing apparatus comprises M light emitting devices and N sensing devices. M emission positions of the M light emitting devices define at least one geometric plane. M is a integer greater than or equal to 3, and N is a positive integer. The exemplary method comprises the following steps: enabling each sensing device to detect a reflected signal reflected from an object when a corresponding light emitting device is activated in order to generate a sensing result corresponding to the light emitting device, wherein the N sensing devices generate M sensing results in response to the M light emitting devices, each of Q sensing results of the M sensing results corresponds to a sensing device and a light emitting device which are not adjacent, and Q is a positive integer; and calculating position information of the object according to Q emission positions of Q light emitting devices corresponding to the Q sensing results, N sensing positions of the N sensing devices and the M sensing results.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
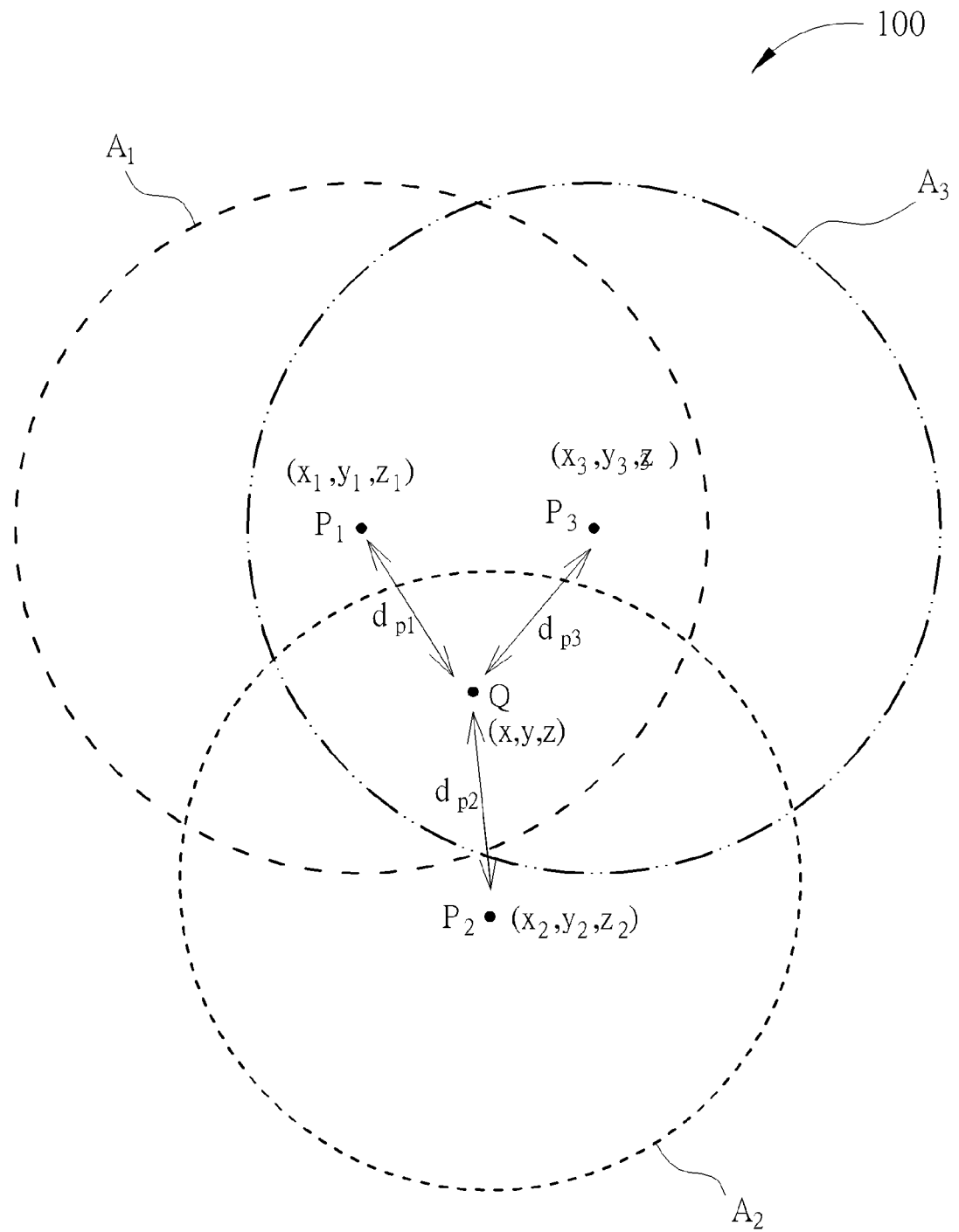
FIG. 1 is a diagram illustrating non-contact position tracking using a triangulation technique in a space according to an embodiment of the present invention.

Please refer to FIG. 1, which is a diagram illustrating non-contact position tracking using a triangulation technique in a space 100 according to an embodiment of the present invention. In this embodiment, an object (not shown in FIG. 1) is located at a specific point Q. When a light signal is emitted from a reference point of a plurality of reference points $P_1$-$P_3$ to the object, the object may reflect the light signal to the reference point or other reference points. Hence, the light signal may have an emission path pointing from a reference point to the specific point Q (i.e. a corresponding travel distance of light may be one of a plurality of distances $d_{P1}$-$d_{P3}$), and a corresponding reflection path pointing from the specific point Q to the reference point (i.e. a reflected signal corresponding to the light signal is received at a location where the light signal is emitted) or other reference points (i.e. the reflected signal is received at a location different from the location where the light signal is emitted). As shown in FIG. 1, if each of a coordinate $(x_1, y_1, z_1)$ of the reference point $P_1$, a coordinate $(x_2, y_2, z_2)$ of the reference point $P_2$ and a coordinate $(x_3, y_3, z_3)$ of the reference point $P_3$ is known, a coordinate (x, y, z) of the object may be obtained by performing mathematical manipulations (e.g. solving a set of equations), thereby tracking a position of the object.

In order to realize non-contact position tracking, at least one of a light emitting device and a sensing device (not shown in FIG. 1) may be provided at each reference point. Hence, a sensing result (e.g. a current or a voltage) may be generated by detecting a reflected signal reflected from the object, wherein each reference point may be one of a sensing position (where the reflected signal is received) and an emission position (where the light signal is emitted), or both the sensing position and the emission position. As energy of the received reflected signal decreases with increasing travel distance of light, the sensing result may be converted into a specific distance by referring to a correspondence between the energy of the received reflected signal and the travel distance of light, wherein the specific distance may be used as a sum of a distance traveled by the light signal (from the emission position to the specific point Q) and a distance traveled by the reflected signal (from the specific point Q to the sensing position). After information of the travel distance of light (i.e. information including the distances $d_{P1}$-$d_{P3}$) is obtained, the coordinate (x, y, z) of the object may be determined accordingly as a position/coordinate of each reference point is known. Hence, the position of the object may be tracked.

It should be noted that the object may be located in an overlapping region of a plurality of sensing spaces $A_1$-$A_3$ in order to obtain effective sensing results associated with the reference points $P_1$-$P_3$, wherein the sensing spaces $A_1$-$A_3$ correspond to the reference points $P_1$-$P_3$, respectively. In addition, the reference points $P_1$-$P_3$ do not lie on the same straight line (i.e. the reference points $P_1$-$P_3$ may define a geometric plane) in the space 100, thus ensuring that the coordinate (x, y, z) of the object can be calculated.

In practice, at least one of the reference points $P_1$-$P_3$ may have a light emitting device disposed thereat, and three sensing devices may be disposed at the reference points $P_1$-$P_3$, respectively. In an alternative design, at least one of the reference points $P_1$-$P_3$ may have a sensing device disposed thereat, and three light emitting devices may be disposed at the reference points $P_1$-$P_3$, respectively. Next, information concerning the distances $d_{P1}$-$d_{P3}$ may be obtained according to at least three reflected signals (corresponding to the reference points $P_1$-$P_3$), and position information of the object may be obtained by performing mathematical manipulations. Further, as a distance between the object and each reference point may change in response to the movement of the object in the space 100, a sensing result of each reflected signal may change with time. Thus, a relationship between the position information of the object and time may be obtained according to reflected signals in order to track the position of the object.

In brief, the proposed optical sensing apparatus may employ M light emitting device (M is a positive integer) to emit light to an object (e.g. a finger), employ N sensing devise (N is a positive integer) to detect reflected signals reflected from the object to thereby obtain at least three sensing results, obtain distance information of the object associated with at least three reference points (which do not lie on the same straight line) according to the obtained sensing results, and employ a triangulation technique to calculate position information of the object in order to realize non-contact position tracking.

Specifically, in a case where M is a positive integer, N is an integer greater than or equal to 3, the N sensing devices may generate N sensing results in response to the M light emitting device (i.e. each sensing device may generate a sensing result), as long as N sensing positions (i.e. reference points) of the N sensing devices may define at least one geometric plane (i.e. the N sensing positions do not lie on the same straight line), the triangulation technique may be employed to process the N sensing results to thereby calculate the position information of the object. In another case where M is an integer greater than or equal to 3, N is a positive integer, the N sensing devices may generate M sensing results in response to the M light emitting device (i.e. each light emitting device corresponds to a sensing result), as long as M emission positions (i.e. reference points) of the M light emitting devices may define at least one geometric plane (i.e. the M emission positions do not lie on the same straight line), the triangulation technique may be employed to process the M sensing results to thereby calculate the position information of the object. To facilitate an understanding of the present invention, exemplary implementations of the proposed optical sensing apparatus, which have different dispositions of sensing device(s) and light emitting device(s), are given in the following for further description.

Figure 2:
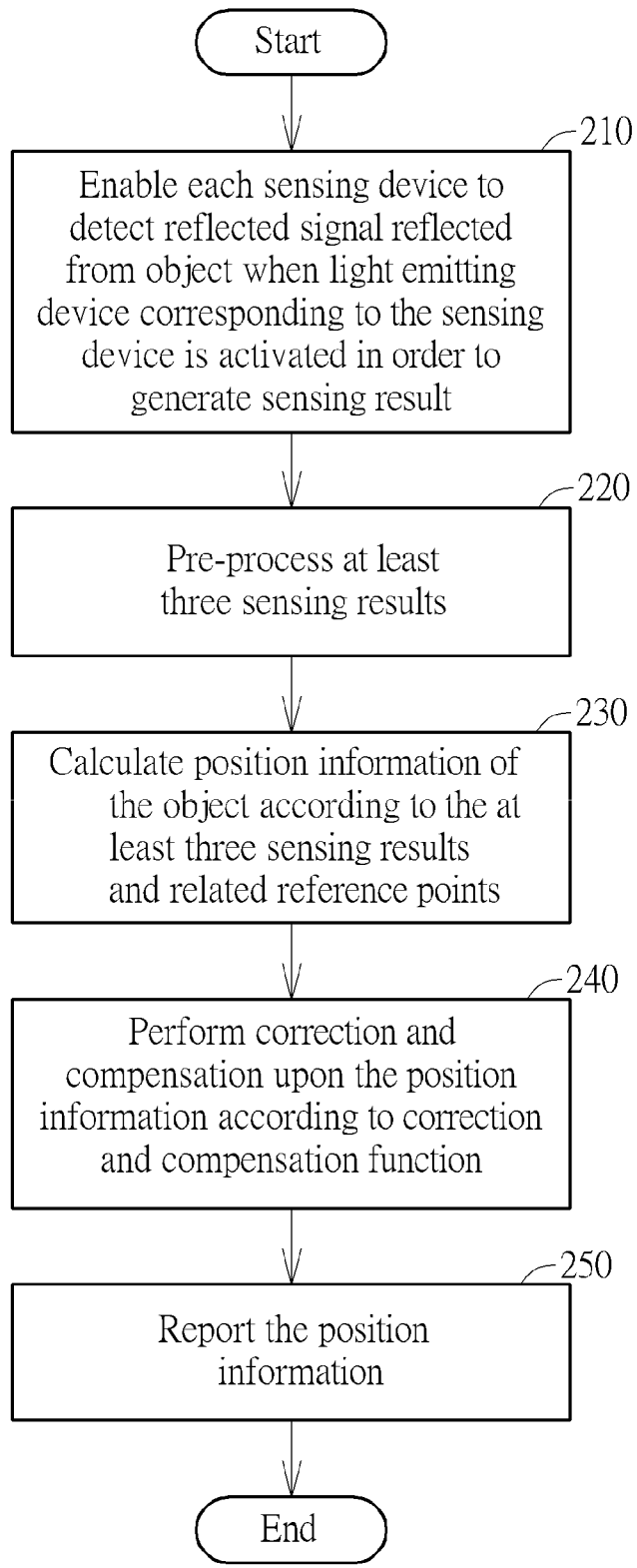
FIG. 2 is a flow chart of an exemplary method of for detecting an object near an optical sensing apparatus according to an embodiment of the present invention.
Figure 3:
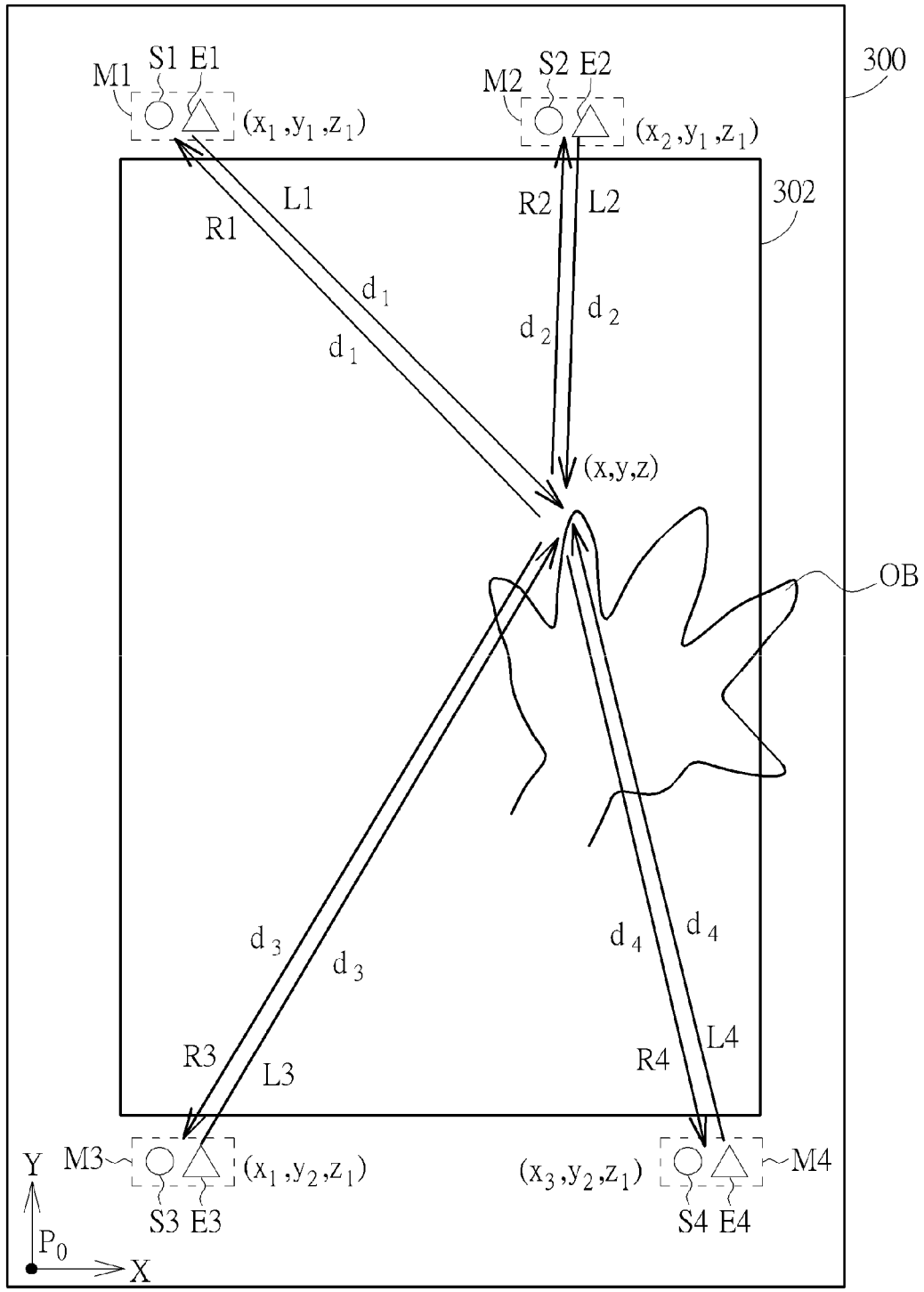
FIG. 3 is a diagram illustrating an exemplary optical sensing apparatus used for non-contact position tracking according to an embodiment of the present invention.
Figure 4:
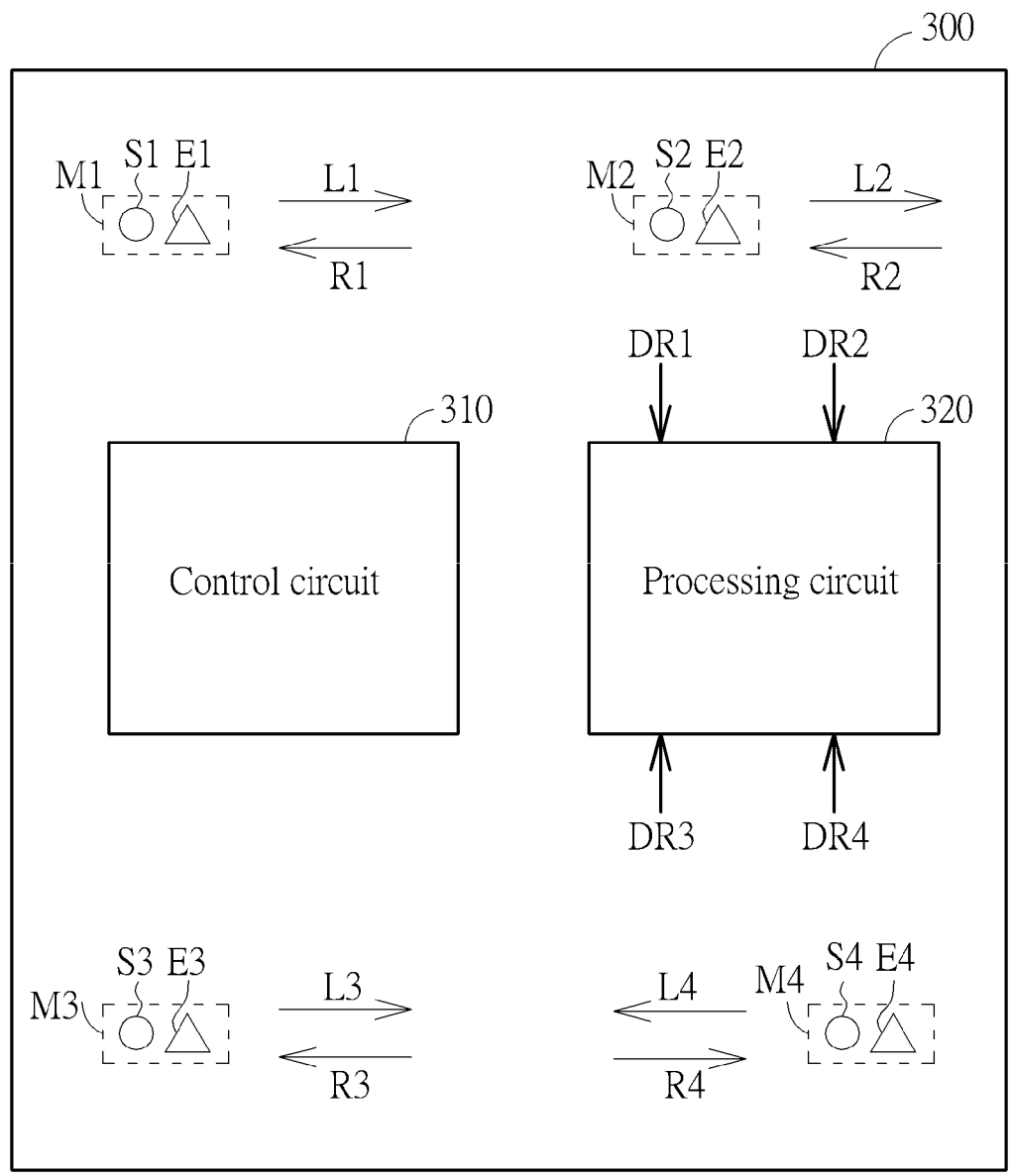
FIG. 4 is a block diagram illustrating the optical sensing apparatus shown in FIG. 3.

Please refer to FIG. 2, FIG. 3 and FIG. 4. FIG. 2 is a flow chart of an exemplary method of for detecting an object near an optical sensing apparatus according to an embodiment of the present invention. FIG. 3 is a diagram illustrating an exemplary optical sensing apparatus used for non-contact position tracking according to an embodiment of the present invention. FIG. 4 is a block diagram illustrating the optical sensing apparatus 300 shown in FIG. 3. The method shown in FIG. 2 may be employed in the optical sensing apparatus 300 shown in FIG. 3. For further illustration of the proposed non-contact position tracking, the optical sensing apparatus 300 may be implemented as a mobile apparatus (e.g. a smart phone or a tablet PC) in the following. However, a person skilled in the art should understand that this is not meant to be a limitation of the present invention.

As shown in FIG. 3 and FIG. 4, the optical sensing apparatus 300 may include a screen 302, a control circuit 310, a processing circuit 320, a plurality of light emitting devices (which are implemented by a plurality of infrared light emitting diodes (IR LEDs) E1-E4 in this embodiment) and a plurality of sensing devices (which are implemented by a plurality of infrared light sensors (IR sensors) S1-S4 in this embodiment). In this embodiment, the number of the IR LEDs may be equal to the number of the IR sensors, and an IR LED and an IR sensor which are adjacent to each other may be implemented by a sensing module (i.e. one of a plurality of sensing modules M1-M4). Additionally, the control circuit 310 may be electrically connected to the IR LEDs E1-E4, the IR sensors S1-S4 and the processing circuit 320, and may be arranged to control activation and deactivation of the R LEDs E1-E4, sensing operations of the IR sensors S1-S4, and signal processing operations of the processing circuit 320.

In step 210, the control circuit 310 may enable each sensing device to detect a reflected signal reflected from an object (e.g. a user's finger OB above the screen 302) when a corresponding light emitting device is activated in order to generate a sensing result corresponding to the sensing device, wherein the IR sensors S1-S4 may generate a plurality of sensing results DR1-DR4 in response to the IR LEDs E1-E4. In practice, the control circuit 310 may enable the IR LEDs E1-E4 alternately according to an activation sequence in order to generate a plurality of IR light signals L1-L4, respectively. Additionally, the control circuit 310 may enable the IR sensors S1-S4 alternately according to the activation sequence in order to detect a plurality of reflected signals R1-R4 reflected from the finger OB, respectively. Hence, each IR sensor may detect a reflected signal reflected from the finger OB during a period in which only one IR LED is activated (i.e. time-division multiplexing (TDM)). For example, the control circuit 310 may activate the R LEDs E1-E4 alternately in a clockwise manner, wherein when the IR LED E1 of the sensing module M1 is activated, the IR LEDs and the IR sensors included in the sensing modules M2-M4 are deactivated. Hence, the reflected signal R1 received by the IR sensor S1 is generated by the finger OB due to reflection of IR light signal L1 which is generated by the IR LED E1. In other words, a reflected signal received by each sensing module corresponds to an IR light signal generated by the sensing module.

The processing circuit 320 is coupled to the IR sensors S1-S4, and may be arranged to receive the sensing results DR1-DR4, which are respectively generated by the IR sensors S1-S4 in response to sensing the reflected signals R1-R4. In step 220, the processing circuit 320 may pre-process the sensing results DR1-DR4. For example, the processing circuit 320 may remove outlier data (e.g. too large or too small sensed data) from the sensing results DR1-DR4, and/or perform a noise filtering operation (e.g. running average filtering) upon the sensing results DR1-DR4.

Next, in step 230, the processing circuit 320 may calculate position information of the object (i.e. the coordinate (x, y, z) of the finger OB) according to at least three of the sensing results DR1-DR4 and related reference points (e.g. sensing positions of sensing devices corresponding to the at least three sensing results). In this embodiment, the processing circuit 320 may convert the sensing results DR1-DR4 into a plurality of sensing counts $C_1$-$C_4$, respectively. For example, the processing circuit 320 may perform an analog-to-digital conversion on the sensing results DR1-DR4. Each sensing count may be substantially proportional to the reciprocal of the square of a travel distance of a corresponding reflected signal. Hence, the processing circuit 320 may obtain a plurality of specific distances $d_1$-$d_4$ according to the following conversion relationship:

$$\frac{\text{reference sensing count } C_0}{\text{sensing count } C_i} = \frac{\frac{1}{d_0^2}}{\frac{1}{d_i^2}},$$

where the reference sensing count $C_0$ and the corresponding reference distance $d_0$ may be obtained using conversion correction, and the parameter i may be 1, 2, 3 or 4. Please refer to the following description of the above conversion relationship.

The sensing count $C_1$ corresponding to the sensing result DR1 is proportional to $1/(d_1+d_1)^2$, the sensing count $C_2$ corresponding to the sensing result DR2 is proportional to $1/(d_2-d_2)^2$, the sensing count $C_3$ corresponding to the sensing result DR3 is proportional to $1/(d_3+d_3)^2$, and the sensing count $C_4$ corresponding to the sensing result DR4 is proportional to $1/(d_4+d_4)^2$. Hence, the reference sensing count $C_0$ and the corresponding reference distance $(d_0+d_0)$ may be obtained by correcting the conversion relationship between the sensing count and the travel distance of the light signal. Next, the processing circuit 320 may obtain the specific distances $d_1$-$d_4$ based on the proportionality (i.e. the above conversion relationship), and use each specific distance as a distance between the finger OB and an IR sensor (or a sensing module/an IR LED) which generates a sensing result corresponding to the specific distance. For example, the specific distance $d_1$ may be used as a distance between the finger OB and the IR sensor S1 which generates the sensing result DR1.

In this embodiment, as each sensing result corresponds to a sensing device and a light emitting device which are adjacent to each other, a distance between an IR sensor and an IR LED included in the a sensing module may be much smaller than that between the sensing module and the finger OB. Hence, for the same sensing module, a sensing position of an IR sensor may be regarded as being identical to an emission position of an IR LED, and a travel distance of an IR light signal may be regarded as being the same as that of a corresponding reflected signal. For example, a position of the sensing module M1 and an emission position of IR LED E1 may be represented by a sensing position of the IR sensor S1 (i.e. the coordinate $(x_1, y_1, z_1)$). In an alternative design, the position of the sensing module M1 and the sensing position of the IR sensor S1 may be represented by the emission position of IR LED E1. Further, the sensing modules M1-M4 may be disposed in the same plane (i.e. each sensing module has the same z coordinate) for illustrative purposes, and a reference point $P_0$ may be used as an origin of the coordinate system in the plane.

Next, the processing circuit 320 may solve a set of equations below to thereby obtain the coordinate (x, y, z) of the finger OB.

$$f_1(x_1,y_1,z_1)=(x_1-x)^2+(y_1-y)^2+(z_1-z)^2-d_1^2=0$$

$$f_2(x_2,y_1,z_1)=(x_2-x)^2+(y_1-y)^2+(z_1-z)^2-d_2^2=0$$

$$f_3(x_1,y_2,z_1)=(x_1-x)^2+(y_2-y)^2+(z_1-z)^2-d_3^2=0$$

$$f_4(x_3,y_2,z_1)=(x_3-x)^2+(y_2-y)^2+(z_1-z)^2-d_4^2=0$$

In other words, the processing circuit 320 may calculate the coordinate (x, y, z) according to the sensing positions of the IR sensors S1-S4 and the specific distances $d_1$-$d_4$. Please note that the processing circuit 320 may select only three of the four equations "$f_1(x_1, y_1, z_1)=0$", "$f_2(x_2, y_1, z_1)=0$", "$f_3(x_1, y_2, z_1)=0$" and "$f_4(x_3, y_2, z_1)=0$" in order to solve for the coordinate (x, y, z). For example, the processing circuit 320 may employ the triangulation method based on three of the sensing results DR1-DR4, which have more sensing counts, to thereby improve the speed of the position information calculation, wherein the sensing result having fewer sensing counts may be used for reference.

In step 240, the processing circuit 320 may performing correction and compensation upon the position information of the object (i.e. the coordinate (x, y, z) of the finger OB) according to a correction and compensation function. As disturbance factors may exist in the background, the aforementioned conversion relationship may be a rough approximation of the correspondence between the sensing count and the specific distance. Hence, the processing circuit 320 may employ the correction and compensation function to compensate the calculated coordinate. By way of example, the X coordinate data and the Y coordinate data may be corrected according to the formulae below.

$$x_c=[1+k_1+k_3(x^2+y^2)]x$$

$$y_c=[1+k_1+k_3(x^2+y^2)]y$$

where the coefficients $k_1$ and $k_3$ are correction factors, which may be positive or negative; the parameters x and y may represent X coordinate value and Y coordinate value obtained before the correction and compensation; and the parameters $x_c$ and $y_c$ may represent X coordinate value and Y coordinate value obtained after the correction and compensation Finally, in step 250, the processing circuit 320 may provide the corrected and compensated position information for the next stage circuit to perform further operations (e.g. gesture recognition).

Please note that the above is for illustrative purposes only, and is not meant to be a limitation of the present invention. For example, in step 210, the processing circuit 320 may enable the IR LEDs E1-E4 and the IR sensors S1-S4 according to a counterclockwise activation sequence, an alternate clockwise and counterclockwise activation sequence, other activation sequences or a random activation sequence. In an alternative design, when an IR LED of a sensing module is activated, the control circuit 310 may control an IR sensor of another sensing module to detect a reflected signal. To put it another way, an IR LED (used for generating an IR light signal during a period of time) and an IR sensor (used for detecting a reflected signal corresponding to the IR light signal during the period of time) may belong to different sensing modules in the TDM operation mode.

Consider a case where each IR LED has an emission band, emission bands of the IR LEDs E1-E4 are different, each IR sensor has a detection band, detection bands of the IR sensors S1-S4 are different, and the emission bands correspond to the detection bands, respectively. As the emission bands do not interfere with each other, the processing circuit 320 may activate the IR LEDs E1-E4 concurrently rather than enable the IR LEDs E1-E4 alternately according to an activation sequence (i.e. the aforementioned TDM). The control circuit 310 may control each IR sensor to detect a corresponding reflected signal when a corresponding IR LED is activated (i.e. frequency division multiplexing (FDM)), thereby increasing the frame rate of the optical sensing apparatus 300.

In an alternative design, the correction and compensation function used in step 240 may be other types of functions. In another alternative design, at least one of step 220 and step 240 may be optional. In yet another alternative design, in addition to performing the correction and compensation in step 240, the processing circuit 320 may use all sensing results to obtain the position information in order to enhance resolution and performance of the position tracking capability. For example, when including n sensing modules, the optical sensing apparatus 300 may obtain n equations "$f_{r1}(x_{r1}, y_{r1}, z_{r1})=0$"–"$f_{rn}(x_{rn}, y_{rn}, z_{rn})=0$" based on steps 210-230 shown in FIG. 2.

$$f_{r1}(x_{r1}, y_{r1}, z_{r1}) = (x_{r1} - x)^2 + (y_{r1} - y)^2 + (z_{r1} - z)^2 - d_{r1}^2 = 0$$

$$f_{r2}(x_{r2}, y_{r2}, z_{r2}) = (x_{r2} - x)^2 + (y_{r2} - y)^2 + (z_{r2} - z)^2 - d_{r2}^2 = 0$$

$$f_{r3}(x_{r3}, y_{r3}, z_{r3}) = (x_{r3} - x)^2 + (y_{r3} - y)^2 + (z_{r3} - z)^2 - d_{r3}^2 = 0$$

$$\ldots$$

$$f_{rn}(x_{rn}, y_{rn}, z_{rn}) = (x_{rn} - x)^2 + (y_{rn} - y)^2 + (z_{rn} - z)^2 - d_{rn}^2 = 0$$

where the coordinates $(x_{r1}, y_{r1}, z_{r1})$–$(x_{rn}, y_{rn}, z_{rn})$ represent positions of the n sensing modules, and the coordinate (x, y, z) represents the position of the object to be tracked. The processing circuit 320 may use the Newton-Raphson method to solve the above n equations.

$$J = \frac{\partial(f_{r1}, f_{r1}, \ldots, f_{m})}{\partial(x, y, z)} = \begin{bmatrix} \frac{\partial f_{r1}}{\partial x} & \frac{\partial f_{r1}}{\partial y} & \frac{\partial f_{r1}}{\partial z} \\ \frac{\partial f_{r2}}{\partial x} & \frac{\partial f_{r2}}{\partial y} & \frac{\partial f_{r2}}{\partial z} \\ \vdots & \vdots & \vdots \\ \frac{\partial f_{m}}{\partial x} & \frac{\partial f_{m}}{\partial y} & \frac{\partial f_{m}}{\partial z} \end{bmatrix}$$

$$P_0 = [x_0, y_0, z_0]$$

where $P_0$ is a first guess for solution. The following iteration may be repeated several times.

$$P_{k+1} = P_k - J^{-1} \cdot f(P_k) = P_k - \Delta P_k$$

$$\Delta P_k = P_{k+1} - P_k$$

where k is an iteration index. When the absolute value of $\Delta P_k$ is smaller than a predetermined value, it is determined that the iteration converges, and the coordinate (x, y, z) of the object may be solved. Additionally, the processing circuit 320 may use the weighted least square (WLS) method to further enhance the performance of the position tracking capability, wherein sensing results having fewer sensing counts are given less weight. As a person skilled in the art should understand the use of the weighted least square method and the Newton-Raphson method, further description is omitted here for brevity. It should be noted that sensing devices of any three of the sensing modules M1-M4 may define a geometric plane (i.e. the sensing devices do not lie on the same straight line). Hence, even though the optical sensing apparatus 300 may include only three of the sensing modules M1-M4, the optical sensing apparatus 300 may obtain three equations based on the aforementioned operations, thereby calculating the position information of the finger OB. In other words, the number of the sensing modules (i.e. n) may be greater than or equal to 3.

In order to enhance the overall sensing performance, the control circuit 310 may adjust emitting power of the IR LEDs E1-E4 according to calculated position information. Additionally, narrow bandpass filter films or cover lenses may be coated/deposited on the sensor areas of the IR sensors S1-S4 in order to suppress other spectrum other than the IR wavelength or a narrow band around the IR wavelength. In a case where the IR LEDs E1-E4 have different emission bands, bandpass filter films corresponding to the emission bands may be coated/deposited on the sensor areas of the IR sensors S1-S4, respectively.

The frame rate of the sensing is one key factor to achieve high quality of triangulation. To achieve a high frame rate, a higher duty cycle (i.e. an activation period) of the light emitting device may be required. In a case where the IR LEDs E1-E4 are activated alternately according to an activation sequence, and the IR sensors S1-S4 perform signal detection according to the activation sequence, the processing circuit 320 may integrate the sensing results DR1-DR4 over the same period of time, and program short analog-to-digital conversion time to convert each sensing result into a sensing count, thereby reducing the overhead and increasing the frame rate.

Figure 5:
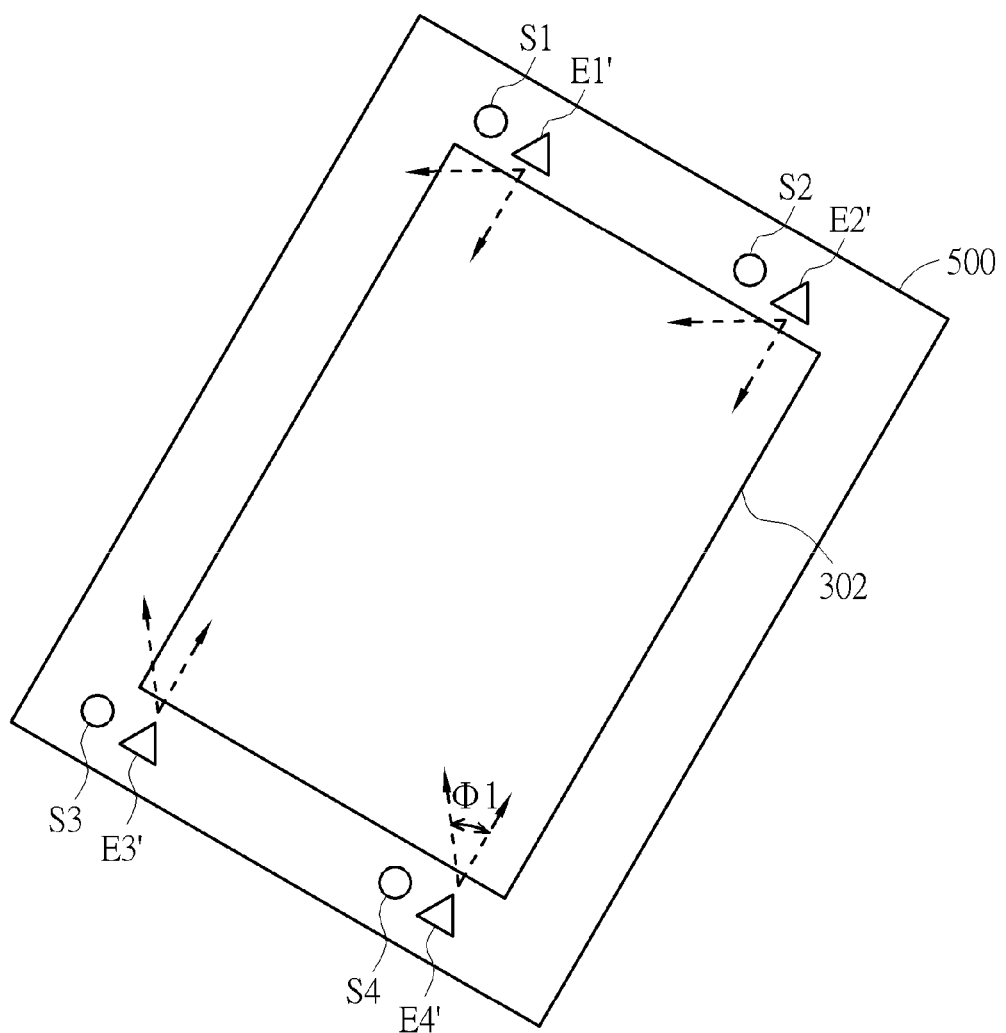
FIG. 5 is an implementation of the optical sensing apparatus shown in FIG. 3.
Figure 6:
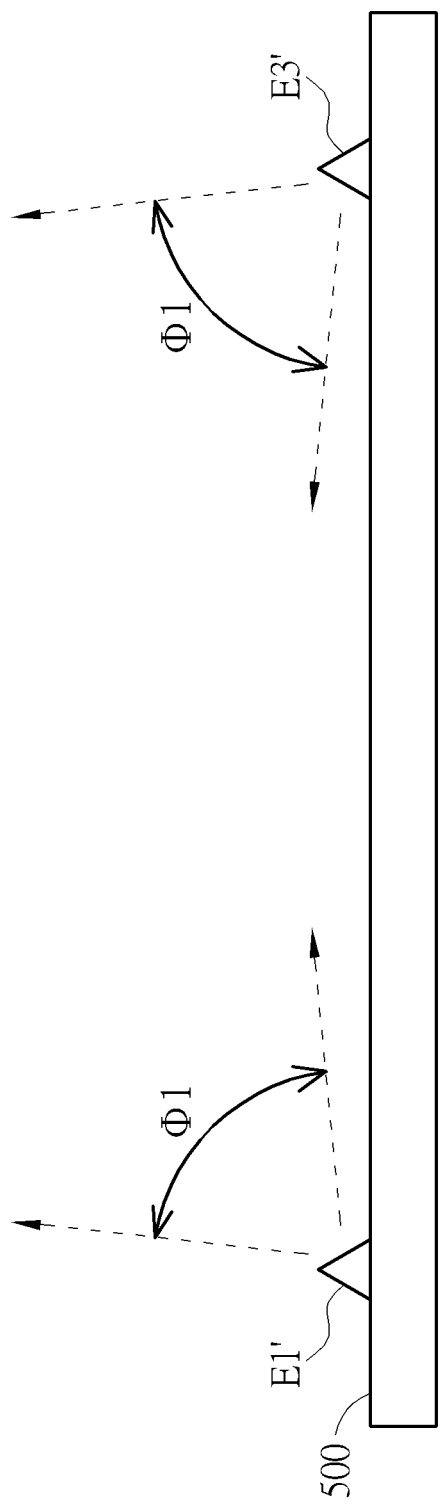
FIG. 6 is cross-sectional view of the optical sensing apparatus shown in FIG. 5.
Figure 7:
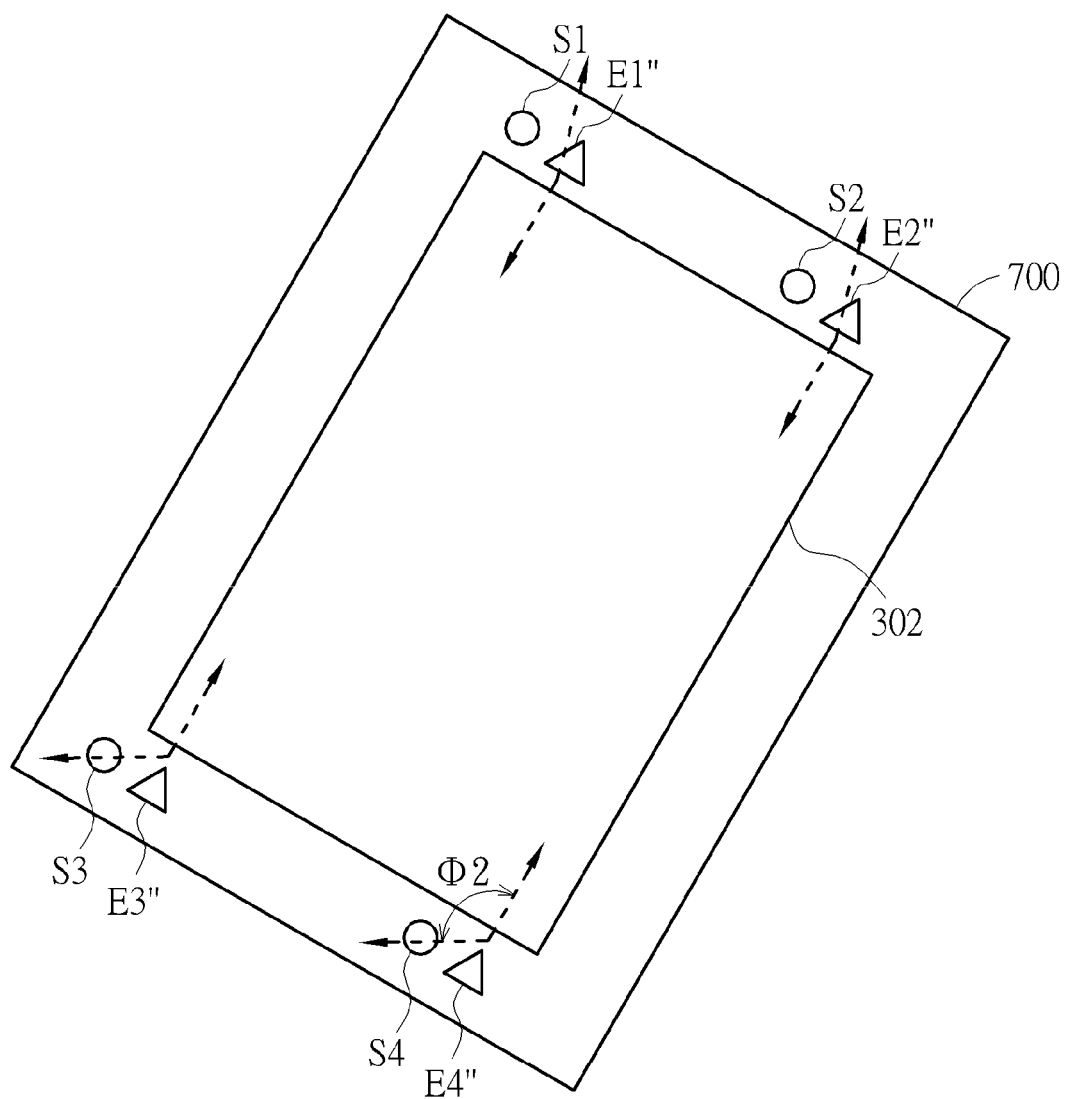
FIG. 7 is another implementation of the optical sensing apparatus shown in FIG. 3.
Figure 8:
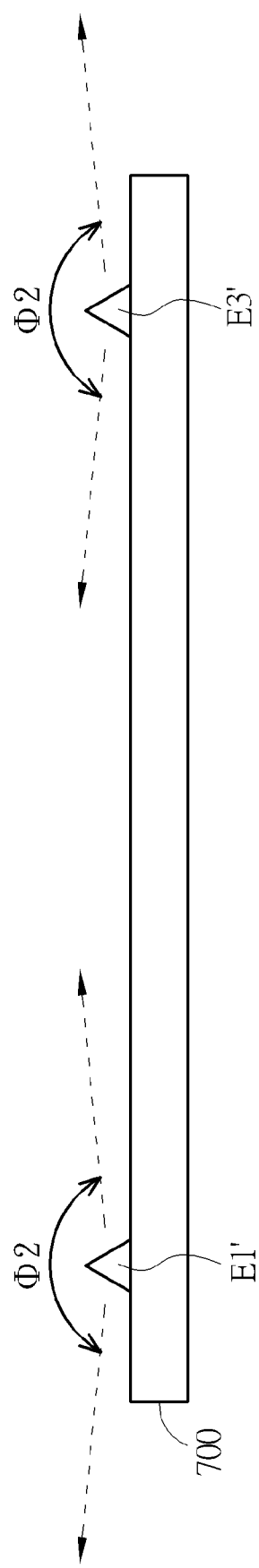
FIG. 8 is cross-sectional view of the optical sensing apparatus shown in FIG. 7.

A triangulation region (or a gesture recognition region) may be defined as a three-dimensional (3D) space where an IR emitting cone (a beam angle) and a sensor viewing cone are overlapped. Please refer to FIG. 5-FIG. 8 together. FIG. 5 is an implementation of the optical sensing apparatus 300 shown in FIG. 3, and FIG. 6 is cross-sectional view of the optical sensing apparatus 500 shown in FIG. 5. The architecture of the optical sensing apparatus 500 is based on that of the optical sensing apparatus 300 shown in FIG. 3, wherein the main difference is that each of the IR LEDs E1'-E4' may have an IR emitting cone $\Phi 1$. FIG. 7 is another implementation of the optical sensing apparatus 300 shown in FIG. 3, and FIG. 8 is cross-sectional view of the optical sensing apparatus 700 shown in FIG. 7. The architecture of the optical sensing apparatus 700 is based on that of the optical sensing apparatus 300 shown in FIG. 3, wherein the main difference is that each of the IR LEDs E1"-E4" may have an IR emitting cone $\Phi 2$.

In the implementation shown in FIG. 5, it is assumed that a sensor viewing cone of each IR sensor is 180°. Hence, a triangulation region (or a gesture recognition region) of the optical sensing apparatus 500 may be determined by the intersection of respective IR emitting cones $\Phi 1$ of the IR LEDs E1'-E4'. Similarly, in the implementation shown in FIG. 7, it is assumed that a sensor viewing cone of each IR sensor is 180°. A triangulation region (or a gesture recognition region) of the optical sensing apparatus 700 may be determined by the intersection of respective IR emitting cones $\Phi 2$ of the IR LEDs E1"-E4". The smaller the IR emitting cone is, the higher the IR light emitting efficiency is. Hence, the optical sensing apparatus 500 may good sensitivity to an object farther away from the screen 302. On the other hand, if the IR emitting cone is larger, the better coverage of the screen 302 can be tracked. Hence, the optical sensing apparatus 700 may have a wider triangulation region (or a gesture recognition region).

Please note that, when the size of the screen 302 of the optical sensing apparatus 500 increases, multiple sensing modules (e.g. more than 4 sensing modules) may be installed in the vicinity of the screen 302 so that the intersection of the sensing space of the sensing modules (e.g. the overlapping region of the sensing spaces $A_1$-$A_3$ shown in FIG. 1) may cover the whole screen 302, thus meeting the requirements of good long-distance sensing performance and a sufficient gesture recognition space.

Figure 9:
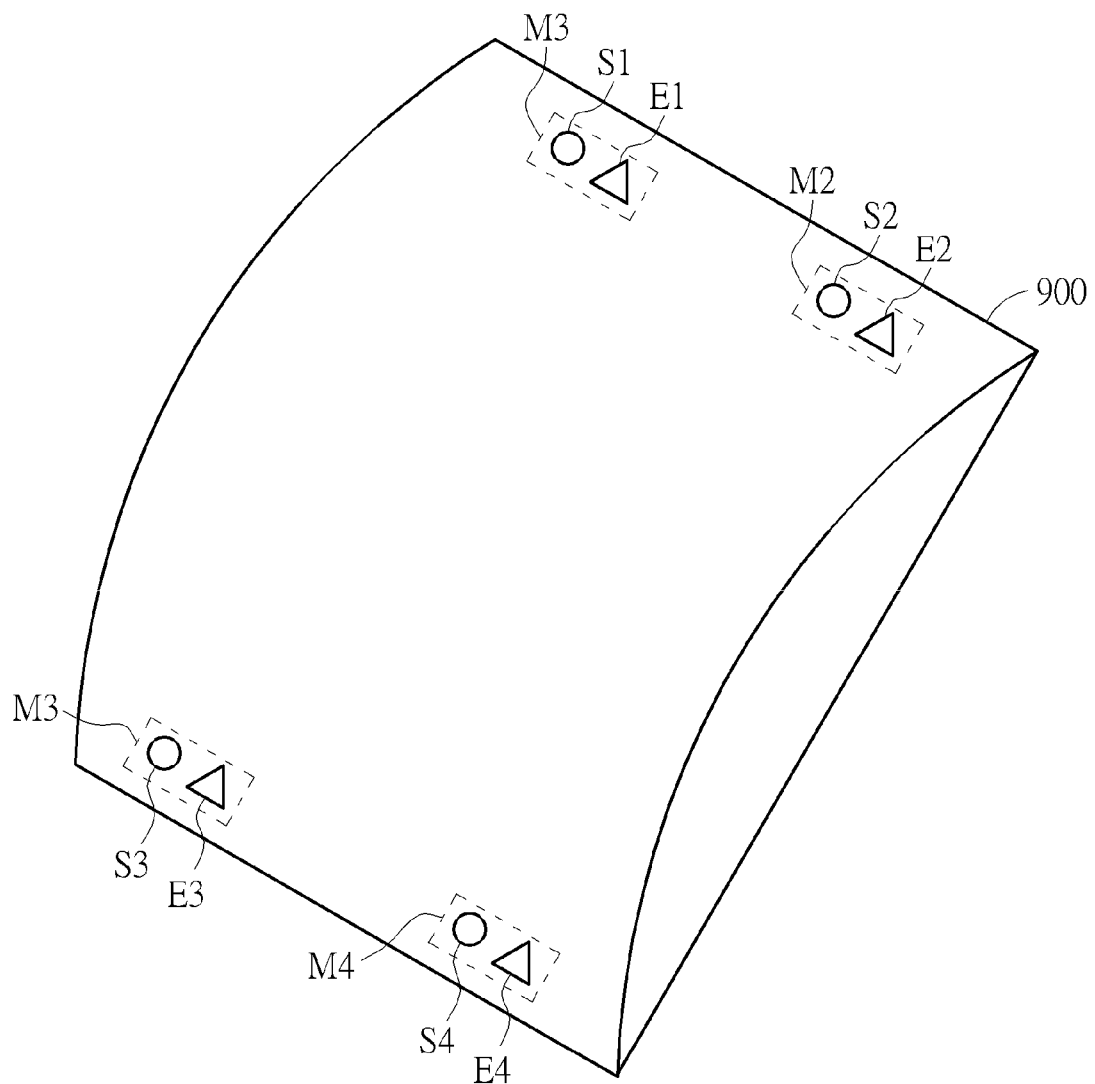
FIG. 9 is an exemplary optical sensing apparatus according to an embodiment of the present invention.

The sensing modules M1-M4 shown in FIG. 3 may have the same z coordinate. This is not meant to be a limitation of the present invention. Please refer to FIG. 9, which is an exemplary optical sensing apparatus according to an embodiment of the present invention. The architecture of the optical sensing apparatus 900 is based on that of the optical sensing apparatus 300 shown in FIG. 3, wherein the main difference is that the sensing modules M1-M4 included in the optical sensing apparatus 900 are installed in a non-plane. In this embodiment, the IR sensors S1-S4 do not lie on the same straight line (i.e. sensing positions of the IR sensors S1-S4 may define at least one geometric plane). Hence, after reading the paragraphs directed to FIG. 1-FIG. 4, a person skilled in the art should understand that the optical sensing apparatus 900 may realize the non-contact position tracking based on the method shown in FIG. 2. Additionally, as long as the IR LEDs E1-E4 do not lie on the same straight line (i.e. emission positions of the IR LEDs E1-E4 may define at least one geometric plane), the optical sensing apparatus 900 may realize the non-contact position tracking.

Figure 10:
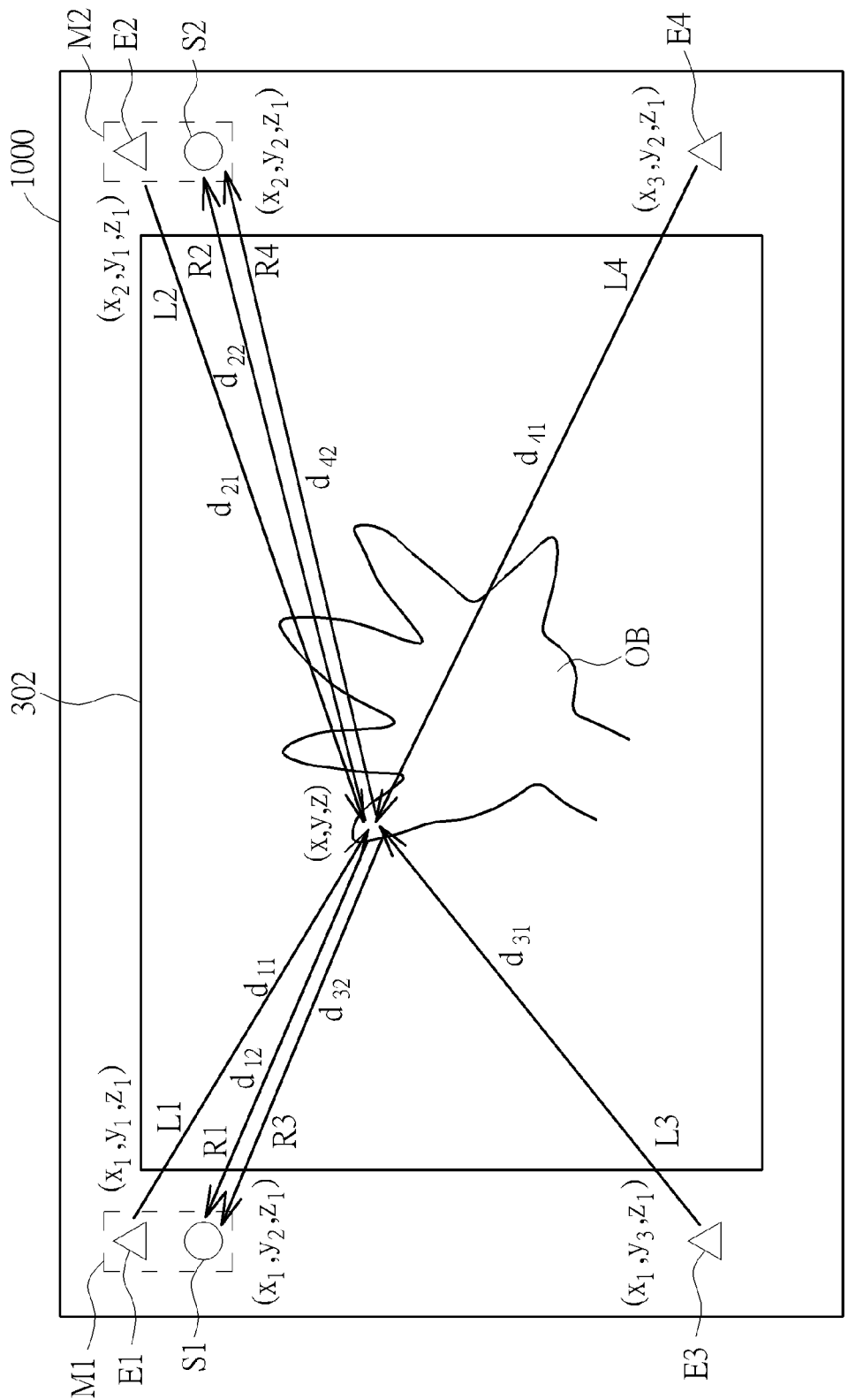
FIG. 10 is a diagram illustrating an exemplary optical sensing apparatus used for non-contact position tracking according to another embodiment of the present invention.

In the embodiment shown in FIG. 3, as each sensing result corresponds to an IR sensor and an IR LED which are adjacent to each other, a distance between an IR sensor and an IR LED included in each sensing module may be much smaller than that between the finger OB and the sensing module. Hence, when a sensing count is converted into a specific distance, an IR sensor and an IR LED may be regarded as being located at the same position, and a travel distance of an IR light signal may be regarded as being the same as that of a corresponding reflected signal. However, this is not meant to be a limitation of the present invention. Please refer to FIG. 10, which is a diagram illustrating an exemplary optical sensing apparatus used for non-contact position tracking according to another embodiment of the present invention. In this embodiment, the optical sensing apparatus 1000 may include the IR LEDs E1-E4 and the IR sensors S1-S2 shown in FIG. 3, a control circuit (not shown in FIG. 10) and a processing circuit (not shown in FIG. 10), wherein the control circuit may be implemented by the control circuit 310 shown in FIG. 3, and the processing circuit may be implemented by the processing circuit 320 shown in FIG. 3. The IR sensor S1 and the IR LED E1 are installed/disposed in the sensing module M1, and the IR sensor S2 and the IR LED E2 are installed/disposed in the sensing module M2. The control circuit may control each IR sensor to detect a reflected signal reflected from an object (e.g. the finger OB) when a corresponding IR LED is activated in order to generate a sensing result corresponding to the IR LED.

In this embodiment, the IR sensor S1 may be arranged for detecting a plurality of reflected signals R1 and R3 (respectively corresponding to the IR LEDs E1 and E3) to generate sensing results (respectively corresponding to the IR LEDs E1 and E3), and the IR sensor S2 may be arranged for detecting a plurality of reflected signals R2 and R4 (respectively corresponding to the IR LEDs E2 and E4) to generate sensing results (respectively corresponding to the IR LEDs E2 and E4). As the emission positions of the IR LEDs E1-E4 may define at least one geometric plane, the sensing results in response to the IR LEDs E1-E4 may be used for triangulation. In this embodiment, as a sensing result corresponds to an IR LED and an IR sensor which are not adjacent, the processing circuit of the optical sensing apparatus 1000 may calculate position information of the finger OB according to the emission positions of the IR LEDs E1-E4, the sensing positions of the IR sensors S1-S2, and the sensing results generated by the IR sensors S1-S2. Further description is given below.

The optical sensing apparatus 1000 may employ the method shown in FIG. 2. When optical sensing apparatus 1000 performs step 210, the control circuit of the optical sensing apparatus 1000 may enable the IR LEDs E1-E4 alternately according to an activation sequence in order to generate a plurality of IR light signals L1-L4, respectively. Additionally, the control circuit may enable the IR sensors S1-S2 according to the activation sequence in order to detect a plurality of reflected signals R1-R4 reflected from the finger OB, respectively. Hence, each IR sensor may detect a reflected signal reflected from the finger OB during a period in which only one IR LED is activated. For example, the control circuit may perform the following steps in sequence: activating the IR LED E1, enabling the IR sensor S1 to detect the reflected signal R1 reflected from the finger OB, and deactivating the IR LED E1 and the IR sensor S1; activating the IR LED E3, enabling the IR sensor S1 to detect the reflected signal R3 reflected from the finger OB, and deactivating the IR LED E3 and the IR sensor S1; activating the IR LED E2, enabling the IR sensor S2 to detect the reflected signal R2 reflected from the finger OB, and deactivating the IR LED E2 and the IR sensor S2; and activating the IR LED E4, enabling the IR sensor S2 to detect the reflected signal R4 reflected from the finger OB, and deactivating the IR LED E4 and the IR sensor S2.

After the above sensing operations, the IR sensor S1 may obtain a sensing result generated in response to the IR LED E1, and a sensing result generated in response to the IR LED E3. Similarly, the IR sensor S2 may obtain a sensing result generated in response to the IR LED E2, and a sensing result generated in response to the IR LED E4. In step 230, the processing circuit of the optical sensing apparatus 1000 may calculate the position information of the finger OB according to the emission positions of the IR LEDs E1-E4, and the sensing positions and the sensing results of the IR sensors S1-S2.

For example, the processing circuit of the optical sensing apparatus 1000 may convert the sensing results obtained by the IR sensors S1-S2 into corresponding sensing counts $C_1'$-$C_4'$, and obtain a plurality of specific distances $(d_{11}+d_{12})$, $(d_{21}+d_{22})$, $(d_{31}+d_{32})$ and $(d_{41}+d_{42})$ according to the conversion relationship below.

$$\frac{\text{reference sensing count } C_0'}{\text{sensing count } C_i'} = \frac{\frac{1}{(d_{01}'+d_{02}')^2}}{\frac{1}{(d_{i1}+d_{i2})^2}}$$

where the reference sensing count $C_0'$ and the corresponding reference distance $(d_{01}'+d_{02}')$ may be obtained using conversion correction, and the parameter i may be 1, 2, 3 or 4. As the sensing count $C_1'$ corresponds to a sensing result that is generated by the IR sensor S1 in response to the IR LED E1, the specific distance $(d_{11}+d_{12})$ corresponding to the sensing count $C_1'$ may be used as a sum of a distance between the IR LED E1 and the finger OB and a distance between the finger OB and the IR sensor S1. Similarly, the specific distance $(d_{21}+d_{22})$ corresponding to the sensing count $C_2'$ may be used as a sum of a distance between the IR LED E2 and the finger OB and a distance between the finger OB and the IR sensor S2, the specific distance $(d_{31}+d_{32})$ corresponding to the sensing count $C_3'$ may be used as a sum of a distance between the IR LED E3 and the finger OB and a distance between the finger OB and the IR sensor S1, and the specific distance $(d_{41}+d_{42})$ corresponding to the sensing count $C_4'$ may be used as a sum of a distance between the IR LED E4 and the finger OB and a distance between the finger OB and the IR sensor S2.

After obtaining the specific distances $(d_{11}+d_{12})$, $(d_{21}+d_{22})$, $(d_{31}+d_{32})$ and $(d_{41}+d_{42})$, the processing circuit of the optical sensing apparatus 1000 may solve at least three of the following equations in order to obtain the coordinate (x, y, z) of the finger OB.

$$[(x_1-x)^2+(y_1-y)^2+(z_1-z)^2]^{\frac{1}{2}} +$$
$$[(x_1-x)^2+(y_2-y)^2+(z_1-z)^2]^{\frac{1}{2}} - (d_{11}+d_{12}) = 0$$
$$[(x_1-x)^2+(y_3-y)^2+(z_1-z)^2]^{\frac{1}{2}} +$$
$$[(x_1-x)^2+(y_2-y)^2+(z_1-z)^2]^{\frac{1}{2}} - (d_{31}+d_{32}) = 0$$
$$[(x_2-x)^2+(y_1-y)^2+(z_1-z)^2]^{\frac{1}{2}} +$$
$$[(x_2-x)^2+(y_2-y)^2+(z_1-z)^2]^{\frac{1}{2}} - (d_{21}+d_{22}) = 0$$
$$[(x_2-x)^2+(y_3-y)^2+(z_1-z)^2]^{\frac{1}{2}} +$$
$$[(x_2-x)^2+(y_2-y)^2+(z_1-z)^2]^{\frac{1}{2}} - (d_{41}+d_{42}) = 0$$

In other words, the processing circuit may calculate the coordinate (x, y, z) according to the emission positions of the IR LEDs E1-E4, the sensing positions of the IR sensors S1-S2 and the specific distances $(d_{11}+d_{12})$, $(d_{21}+d_{22})$, $(d_{31}+d_{32})$ and $(d_{41}+d_{42})$. It should be noted that, when an IR LED and an IR sensor included in the same sensing module shown in FIG. 3 are not adjacent, the optical sensing apparatus 300 may employ the above mathematical manipulations to convert a sensing result of each sensing module into a specific distance, wherein the specific distance may be used as a sum of a distance between the finger OB and an IR LED corresponding to the sensing result and a distance between the finger OB and an IR sensor generating the sensing result. Hence, the optical sensing apparatus 300 may calculate the position information of the object according to an emission position of each IR LED, a sensing position of each IR sensor, and each sensing result (or each specific distance).

The aforementioned device pairing of a signal emitting device and a signal receiving device is for illustrative purposes only. In an alternative design, when the IR LED E1 is activated, the control circuit of the optical sensing apparatus 1000 may enable the IR sensor S2 in the sensing module M2 to detect a corresponding reflected signal; when the IR LED E2 is activated, the control circuit of the optical sensing apparatus 1000 may enable the IR sensor S1 in the sensing module M1 to detect a corresponding reflected signal.

In another alternative design, the IR sensor S1 and the IR LED E1 (corresponding to the sensing result of the sensing module M1) are adjacent, and the IR sensor S2 and the IR LED E2 (corresponding to the sensing result of the sensing module M2) are adjacent, implying that a distance between the IR sensor S1 and the IR LED E1 may be much smaller than that between the finger OB and the IR sensor S1 (or the IR LED E1) and a distance between the IR sensor S2 and the IR LED E2 may be much smaller than that between the finger OB and the IR sensor S2 (or the IR LED E2). Hence, the set of equations involved with the specific distances $(d_{11}+d_{12})$, $(d_{21}+d_{22})$, $(d_{31}+d_{32})$ and $(d_{41}+d_{42})$ may be simplified as follows.

$$2[(x_1 - x)^2 + (y_2 - y)^2 + (z_1 - z)^2]^{\frac{1}{2}} - 2(d_{12}) = 0$$

$$[(x_1 - x)^2 + (y_3 - y)^2 + (z_1 - z)^2]^{\frac{1}{2}} +$$
$$[(x_1 - x)^2 + (y_2 - y)^2 + (z_1 - z)^2]^{\frac{1}{2}} - (d_{31} + d_{32}) = 0$$

$$2[(x_2 - x)^2 + (y_2 - y)^2 + (z_1 - z)^2]^{\frac{1}{2}} - 2(d_{22}) = 0$$

$$[(x_2 - x)^2 + (y_3 - y)^2 + (z_1 - z)^2]^{\frac{1}{2}} +$$
$$[(x_2 - x)^2 + (y_2 - y)^2 + (z_1 - z)^2]^{\frac{1}{2}} - (d_{41} + d_{42}) = 0$$

$$[(x_1-x)^2+(y_3-y)^2+(z_1-z)^2]^{1/2}+[(x_1-x)^2+(y_2-y)^2+(z_1-z)^2]^{1/2}-(d_{31}+d_{32})=0$$

$$2[(x_2-x)^2+(y_2-y)^2+(z_1-z)^2]^{1/2}-2(d_{22})=0$$

$$[(x_2-x)^2+(y_3-y)^2+(z_1-z)^2]^{1/2}+[(x_2-x)^2+(y_2-y)^2+(z_1-z)^2]^{1/2}-(d_{41}-d_{42})=0$$

The simplified equations are obtained by regarding an emission position of an IR LED as a sensing position of an IR sensor in the same sensing module (e.g. the coordinate $(x_1, y_2, z_1)$ is used as the emission position of the IR LED E1). Hence, the processing circuit of the optical sensing apparatus 1000 may calculate the coordinate $(x, y, z)$ according to the emission positions of the IR LEDs E3 and E4, the sensing positions of the IR sensors S1 and S2, and the specific distances $d_{12}$, $d_{22}$, $(d_{31}+d_{32})$ and $(d_{41}+d_{42})$, wherein the specific distances $d_{12}$ may be used as a distance between the finger OB and the IR sensor S1, and the specific distances $d_{22}$ may be used as a distance between the finger OB and the IR sensor S2.

In one implementation, the calculation of the position information may be simplified by regarding a sensing position of an IR sensor as an emission position of an IR LED in the same sensing module (e.g. the coordinate $(x_1, y_1, z_1)$ is used as the sensing position of the IR sensor S1).

Please note that any three of the IR LEDs E1-E4 may define a geometric plane (i.e. any three of the IR LEDs E1-E4 do not lie on the same straight line). Hence, even though the optical sensing apparatus 1000 may have only three of the IR LEDs E1-E4 (e.g. the IR LEDs E1-E3), three equations may be obtained based on the description of FIG. 10, and the position information of the finger OB may be calculated accordingly.

In view of the above, when a sensing result corresponds to an IR LED and an IR sensor which are adjacent to each other, the sensing result may be converted into a specific distance (e.g. the specific distance $d_1$ shown in FIG. 3 or the specific distance $d_{12}$ shown in FIG. 10), wherein the specific distance may be used as a distance between the finger OB and the IR sensor which generates the sensing result (or the IR LED corresponding to the sensing result), and the specific distance and the sensing position of the corresponding IR sensor (or the emission position of the corresponding IR LED) may be used to calculate the position information of the finger OB. When another sensing result corresponds to an IR LED and an IR sensor which are not adjacent, the another sensing result may be converted into another specific distance (e.g. the specific distance $(d_{31}+d_{32})$ shown in FIG. 10), wherein the another specific distance may be used as a sum of a distance between the finger OB and the IR sensor which generates the another sensing result and a distance between the finger OB and the IR LED which corresponds to the another sensing result, and the another specific distance, the sensing position of the corresponding IR sensor and the emission position of the corresponding IR LED may be used to calculate the position information of the finger OB.

Figure 11:
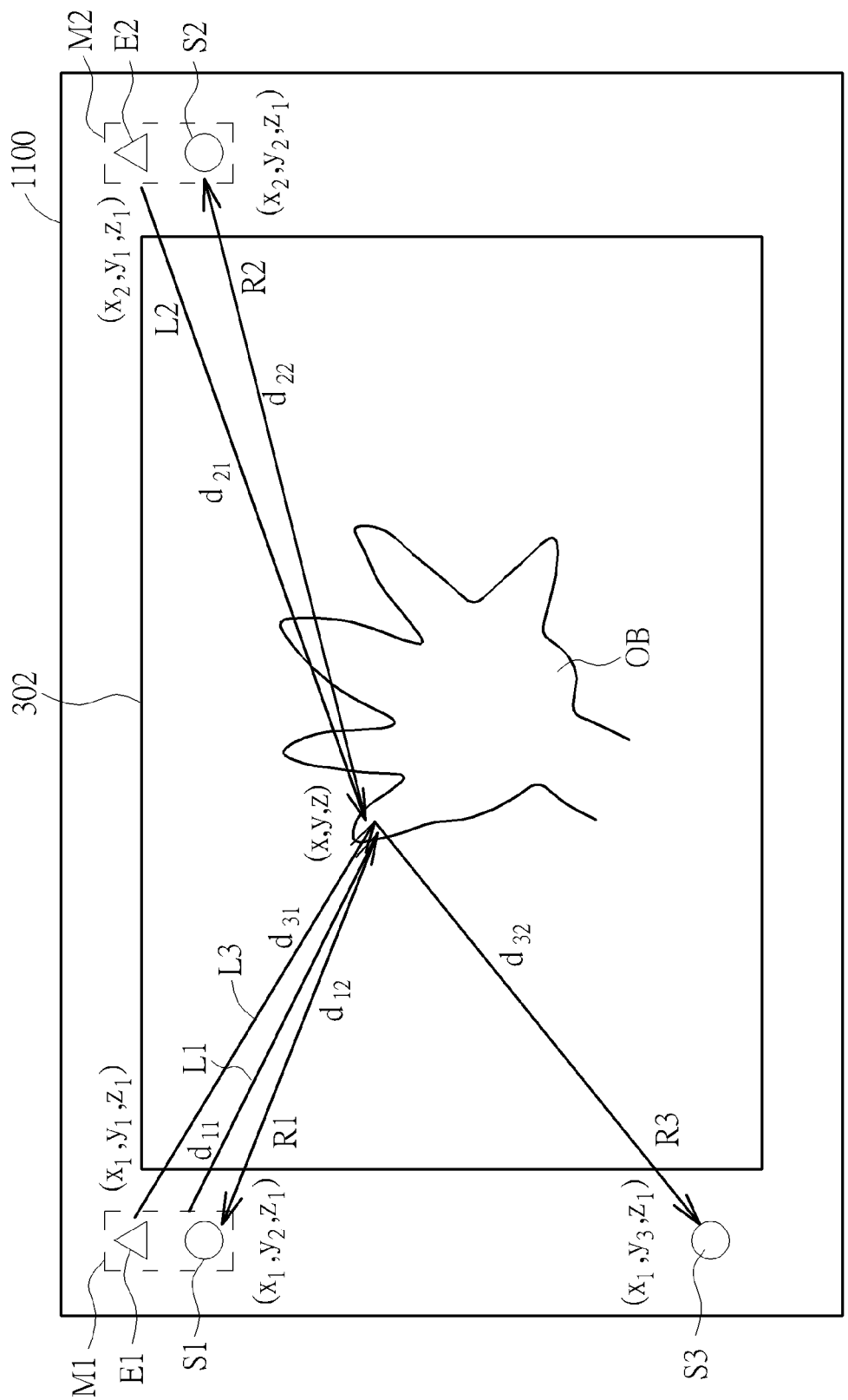
FIG. 11 is a diagram illustrating an exemplary optical sensing apparatus used for non-contact position tracking according to another embodiment of the present invention.

Please refer to FIG. 11, which is a diagram illustrating an exemplary optical sensing apparatus used for non-contact position tracking according to another embodiment of the present invention. The architecture of the optical sensing apparatus 1100 is based on that of the optical sensing apparatus 300 shown in FIG. 3 (i.e. the optical sensing apparatus 1100 may include a plurality of IR sensors which may define at least one geometric plane). The optical sensing apparatus 1100 may include the IR LEDs E1-E2 and the IR sensors S1-S3 shown in FIG. 3, a control circuit (not shown in FIG. 11) and a processing circuit (not shown in FIG. 11), wherein the control circuit may be implemented by the control circuit 310 shown in FIG. 3, and the processing circuit may be implemented by the processing circuit 320 shown in FIG. 3. The IR sensor S1 and the IR LED E1 are installed/disposed in the sensing module M1, and the IR sensor S2 and the IR LED E2 are installed/disposed in the sensing module M2. The control circuit may control each IR sensor to detect a reflected signal reflected from an object (e.g. the finger OB) when a corresponding IR LED is activated in order to generate a sensing result corresponding to the IR sensor. In this embodiment, the IR sensor S1 may be arranged for detecting a reflected signal R1 corresponding to the IR LED E1 to generate a corresponding sensing result; the IR sensor S2 may be arranged for detecting a reflected signal R2 corresponding to the IR LED E2 to generate a corresponding sensing result; the IR sensor S3 may be arranged for detecting a reflected signal R3 corresponding to the IR LED E1 to generate a corresponding sensing result.

The optical sensing apparatus 1100 may employ the method shown in FIG. 2 to track a position of the finger OB. In practice, the control circuit of the optical sensing apparatus 1100 may enable the IR LEDs E1-E2 according to an activation sequence in order to generate a plurality of IR light signals L1-L3, respectively, and enable the IR sensors S1-S3 alternately according to the activation sequence in order to detect the reflected signals R1-R3 reflected from the finger OB, respectively. Hence, each IR sensor may detect a reflected signal reflected from the finger OB during a period in which only one IR LED is activated. Next, the processing circuit of the optical sensing apparatus 1100 may calculate the position information of the finger OB according to the emission positions of the IR LEDs E1-E2, and the sensing positions and the sensing results of the IR sensors S1-S3. For example, the processing circuit of the optical sensing apparatus 1100 may convert a sensing result of each IR sensor into a specific distance, and obtain the coordinate (x, y, z) of the finger OB from a set of equations below.

$$[(x_1 - x)^2 + (y_1 - y)^2 + (z_1 - z)^2]^{\frac{1}{2}} +$$
$$[(x_1 - x)^2 + (y_2 - y)^2 + (z_2 - z)^2]^{\frac{1}{2}} - (d_{11} + d_{12}) = 0$$
$$[(x_1 - x)^2 + (y_1 - y)^2 + (z_1 - z)^2]^{\frac{1}{2}} +$$
$$[(x_1 - x)^2 + (y_3 - y)^2 + (z_1 - z)^2]^{\frac{1}{2}} - (d_{31} + d_{32}) = 0$$
$$[(x_2 - x)^2 + (y_1 - y)^2 + (z_1 - z)^2]^{\frac{1}{2}} +$$
$$[(x_2 - x)^2 + (y_2 - y)^2 + (z_1 - z)^2]^{\frac{1}{2}} - (d_{21} + d_{22}) = 0$$

where the specific distance $(d_{11}+d_{12})$ may be used as a sum of a distance between the IR LED E1 and the finger OB and a distance between the finger OB and the IR sensor S1, the specific distance $(d_{21}+d_{22})$ may be used as a sum of a distance between the IR LED E2 and the finger OB and a distance between the finger OB and the IR sensor S2, and the specific distance $(d_{31}+d_{32})$ may be used as a sum of a distance between the IR LED E1 and the finger OB and a distance between the finger OB and the IR sensor S3. As a person skilled in the art should understand the derivation of the set of equations involved with the optical sensing apparatus 1100 after reading the paragraphs directed to FIG. 1-FIG. 10, further description here is omitted for brevity.

Please note that, in a case where the IR LED E1 and the IR sensor S1 (both corresponding to the same sensing result) are adjacent, the emission position of the IR LED E1 may be regarded as being identical to the sensing position of the IR sensor S1, and the specific distance $(d_{11}+d_{12})$ may be approximated as $2d_{12}$. Additionally, in a case where the IR LED E2 and the IR sensor S2 (both corresponding to the same sensing result) are adjacent, the emission position of the IR LED E2 may be regarded as being identical to the sensing position of the IR sensor S2, and the specific distance $(d_{21}+d_{22})$ may be approximated as $2d_{22}$. Hence, the set of equations involved with the optical sensing apparatus 1100 may be rewritten as follows:

$$2[(x_1 - x)^2 + (y_2 - y)^2 + (z_1 - z)^2]^{\frac{1}{2}} - 2(d_{12}) = 0$$
$$[(x_1 - x)^2 + (y_1 - y)^2 + (z_1 - z)^2]^{\frac{1}{2}} +$$
$$[(x_1 - x)^2 + (y_3 - y)^2 + (z_1 - z)^2]^{\frac{1}{2}} - (d_{31} + d_{32}) = 0$$
$$2[(x_2 - x)^2 + (y_2 - y)^2 + (z_1 - z)^2]^{\frac{1}{2}} - 2(d_{22}) = 0$$

In other words, the processing circuit of the optical sensing apparatus 1100 may calculate the coordinate (x, y, z) according to the emission position of the IR LED E1, the sensing positions of the IR sensors S1-S3, and the specific distances $d_{12}$, $d_{22}$ and $(d_{31}+d_{32})$, wherein the specific distances $d_{12}$ may be used as a distance between the finger OB and the IR sensor S1, and the specific distances $d_{22}$ may be used as a distance between the finger OB and the IR sensor S2. In an alternative design, the emission position of the IR LED E1 may be approximated as the sensing position of the IR sensor S1 so as to simplify the second equation (i.e. the equation involved with the specific distance $(d_{31}+d_{32})$).

Figure 12:
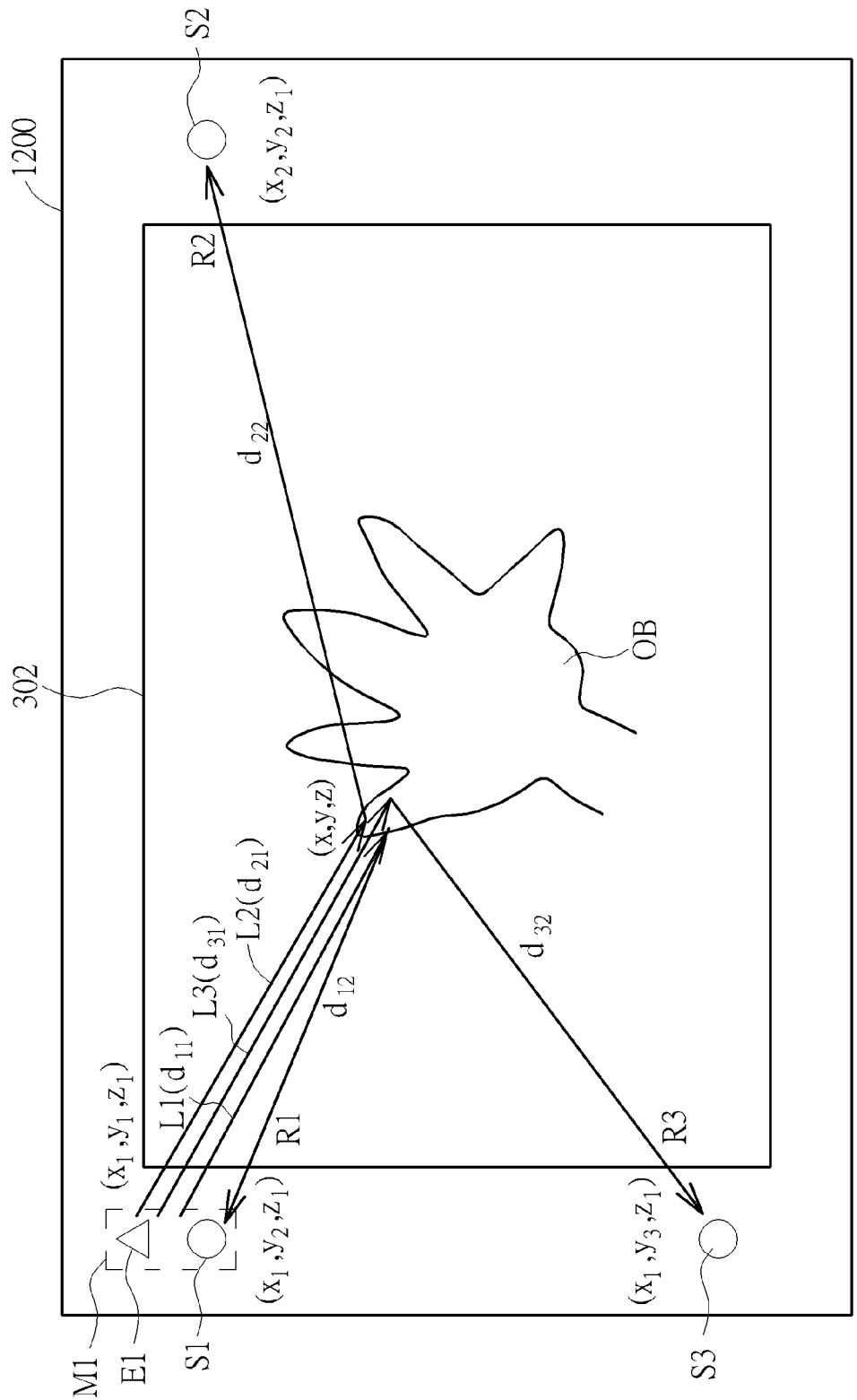
FIG. 12 is a diagram illustrating an exemplary optical sensing apparatus used for non-contact position tracking according to another embodiment of the present invention.

The proposed optical sensing apparatus may use a single light emitting device and at least three sensing devices to realize the non-contact position tracking. Please refer to FIG. 12, which is a diagram illustrating an exemplary optical sensing apparatus used for non-contact position tracking according to another embodiment of the present invention. The architecture of the optical sensing apparatus 1200 is based on that of the optical sensing apparatus 1100 shown in FIG. 11, wherein the main difference is that the optical sensing apparatus 1200 includes only one light emitting device (i.e. the IR LED E1). In this embodiment, the IR sensors S1-S3 may be arranged to detect reflected signals corresponding to the IR LED E1.

The optical sensing apparatus 1200 may employ the method shown in FIG. 2 to track a position of the finger OB. In practice, when the IR LED E1 is activated, the control circuit of the optical sensing apparatus 1200 (not shown in FIG. 12) may enable the IR sensors S1-S3 concurrently in order to detect the reflected signals R1-R3 (respectively corresponding to the IR light signals L1-L3) reflected from the finger OB, respectively. Next, the processing circuit of the optical sensing apparatus 1200 (not shown in FIG. 12) may calculate the position information of the finger OB according to the emission position of the IR LED E1, and the sensing positions and the sensing results of the IR sensors S1-S3. For example, the processing circuit of the optical sensing apparatus 1200 may convert a sensing result of each IR sensor into a specific distance, and obtain the coordinate (x, y, z) of the finger OB from a set of equations below.

$$[(x_1 - x)^2 + (y_1 - y)^2 + (z_1 - z)^2]^{\frac{1}{2}} +$$
$$[(x_1 - x)^2 + (y_2 - y)^2 + (z_1 - z)^2]^{\frac{1}{2}} - (d_{11} + d_{12}) = 0$$
$$[(x_1 - x)^2 + (y_1 - y)^2 + (z_1 - z)^2]^{\frac{1}{2}} +$$
$$[(x_1 - x)^2 + (y_3 - y)^2 + (z_1 - z)^2]^{\frac{1}{2}} - (d_{31} + d_{32}) = 0$$
$$[(x_1 - x)^2 + (y_1 - y)^2 + (z_1 - z)^2]^{\frac{1}{2}} +$$
$$[(x_2 - x)^2 + (y_2 - y)^2 + (z_1 - z)^2]^{\frac{1}{2}} - (d_{21} + d_{22}) = 0$$

where the specific distance $(d_{11}+d_{12})$ may be used as a sum of a distance between the IR LED E1 and the finger OB and a distance between the finger OB and the IR sensor S1, the specific distance $(d_{21}+d_{22})$ may be used as a sum of a distance between the IR LED E1 and the finger OB and a distance between the finger OB and the IR sensor S2, and the specific distance $(d_{31}+d_{32})$ may be used as a sum of a distance between the IR LED E1 and the finger OB and a distance between the finger OB and the IR sensor S3.

Please note that, when the IR LED E1 and the IR sensor S1 (both corresponding to the sensing result of the sensing module M1) are adjacent, implying that a distance between the IR sensor S1 and the IR LED E1 may be much smaller than that between the finger OB and the IR sensor S1 (or the IR LED E1), the above equations involved with the optical sensing apparatus 1200 may be rewritten as follows:

$$2[(x_1 - x)^2 + (y_2 - y)^2 + (z_1 - z)^2]^{\frac{1}{2}} - 2(d_{12}) = 0$$

$$[(x_1 - x)^2 + (y_1 - y)^2 + (z_1 - z)^2]^{\frac{1}{2}} +$$
$$[(x_1 - x)^2 + (y_3 - y)^2 + (z_1 - z)^2]^{\frac{1}{2}} - (d_{31} + d_{32}) = 0$$

$$[(x_1 - x)^2 + (y_1 - y)^2 + (z_1 - z)^2]^{\frac{1}{2}} +$$
$$[(x_2 - x)^2 + (y_2 - y)^2 + (z_1 - z)^2]^{\frac{1}{2}} - (d_{21} + d_{22}) = 0$$

In other words, the processing circuit of the optical sensing apparatus 1200 may calculate the coordinate (x, y, z) according to the emission position of the IR LED E1, the sensing positions of the IR sensors S1-S3, and the specific distances $d_{12}$, $(d_{21}+d_{22})$ and $(d_{31}+d_{32})$, wherein the specific distances $d_{12}$ may be used as a distance between the finger OB and the IR sensor S1. In an alternative design, the emission position of the IR LED E1 may be approximated as the sensing position of the IR sensor S1 so as to simplify the second equation (i.e. the equation involved with the specific distance $(d_{31}+d_{32})$) and the third equation (i.e. the equation involved with the specific distance $(d_{21}+d_{22})$).

Figure 13:
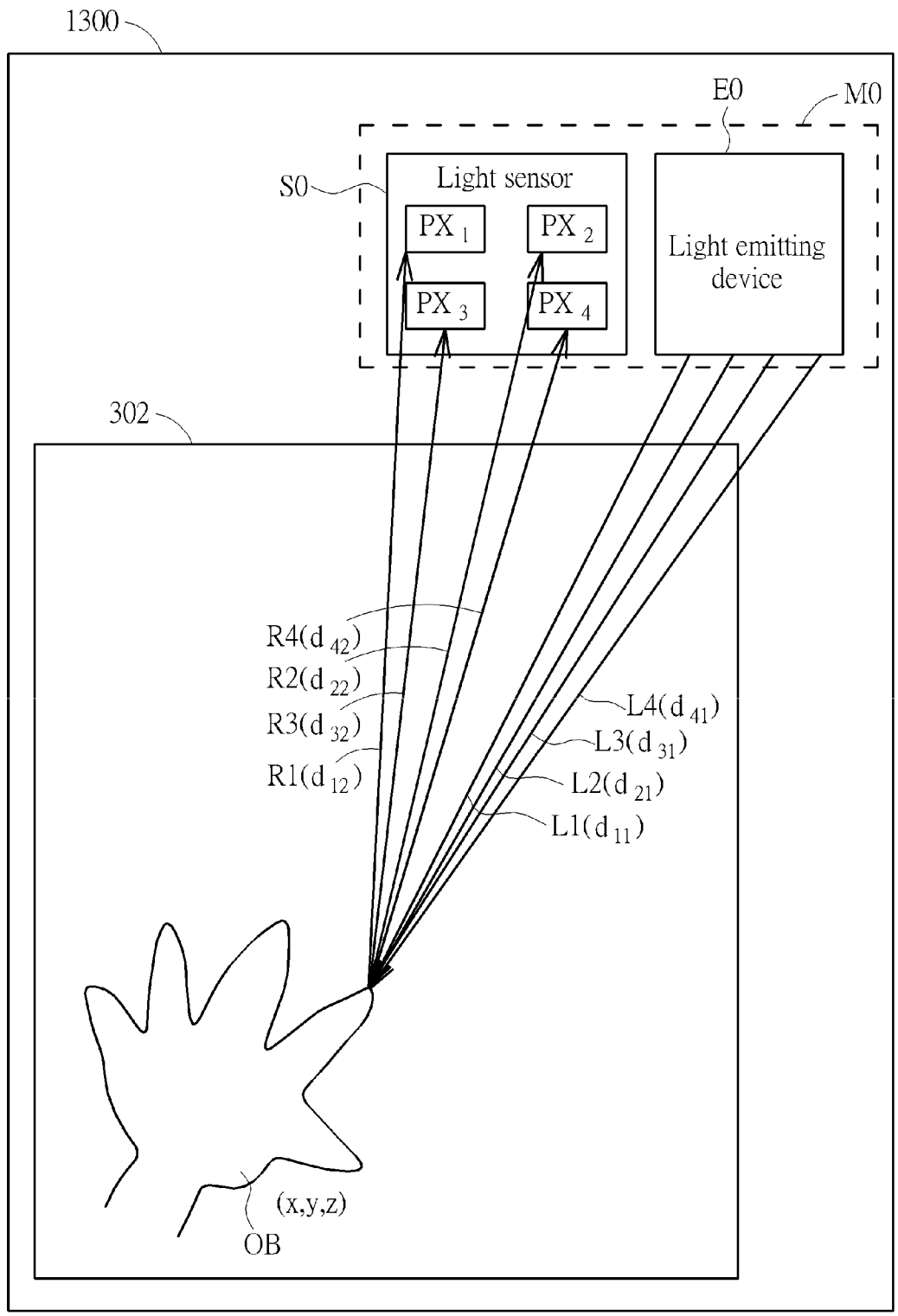
FIG. 13 is a diagram illustrating an exemplary optical sensing apparatus used for non-contact position tracking according to another embodiment of the present invention.

The aforementioned optical sensing mechanism associated with the single light emitting device and the at least three sensing devices may be employed in a single sensing module. Please refer to FIG. 13, which is a diagram illustrating an exemplary optical sensing apparatus used for non-contact position tracking according to another embodiment of the present invention. The architecture of the optical sensing apparatus 1300 is based on that of the optical sensing apparatus 300 shown in FIG. 3 (i.e. the optical sensing apparatus 1300 may include a plurality of IR sensors which may define at least one geometric plane). In this embodiment, the optical sensing apparatus 1300 may include a single sensing module M0, a control circuit (not shown in FIG. 13) and a processing circuit (not shown in FIG. 13), wherein the control circuit may be implemented by the control circuit 310 shown in FIG. 3, and the processing circuit may be implemented by the processing circuit 320 shown in FIG. 3. The sensing module M0 may include a light sensor S0 and a light emitting device E0 (e.g. an IR LED), wherein the light sensor S0 may include a plurality of sensing devices, and the sensing devices may be implemented by a plurality of IR sensing pixels $PX_1$-$PX_4$.

The sensing operation of each IR sensing pixel is similar/identical to that of an IR sensor shown in FIG. 3. Additionally, the optical sensing apparatus 1300 may employ the method shown in FIG. 2 to track a position of the finger OB. In practice, when the light emitting device E0 is activated, the control circuit of the optical sensing apparatus 1300 may enable the IR sensing pixels $PX_1$-$PX_4$ concurrently in order to detect the reflected signals R1-R4 (respectively corresponding to the IR light signals L1-L4) reflected from the finger OB, respectively. Hence, each IR sensing pixel may generate a corresponding sensing result. Next, the processing circuit of the optical sensing apparatus 1300 may calculate the position information of the finger OB according to the emission position $(x_3, y_3, z_1)$ of the light emitting device E0, the sensing position $(x_1, y_1, z_1)$ of the IR sensing pixel $PX_1$, the sensing position $(x_2, y_1, z_1)$ of the IR sensing pixel $PX_2$, the sensing position $(x_1, y_2, z_1)$ of the IR sensing pixel $PX_3$, the sensing position $(x_2, y_2, z_1)$ of the IR sensing pixel $PX_4$, and the sensing results of the IR sensing pixels $PX_1$-$PX_4$. For example, the processing circuit of the optical sensing apparatus 1300 may convert a sensing result of each IR sensing pixel into a specific distance, and obtain the coordinate (x, y, z) of the finger OB from a set of equations below.

$$[(x_1 - x)^2 + (y_1 - y)^2 + (z_1 - z)^2]^{\frac{1}{2}} +$$
$$[(x_3 - x)^2 + (y_3 - y)^2 + (z_1 - z)^2]^{\frac{1}{2}} - (d_{11} + d_{12}) = 0$$

$$[(x_2 - x)^2 + (y_1 - y)^2 + (z_1 - z)^2]^{\frac{1}{2}} +$$
$$[(x_3 - x)^2 + (y_3 - y)^2 + (z_1 - z)^2]^{\frac{1}{2}} - (d_{21} + d_{22}) = 0$$

$$[(x_1 - x)^2 + (y_3 - y)^2 + (z_1 - z)^2]^{\frac{1}{2}} +$$
$$[(x_3 - x)^2 + (y_3 - y)^2 + (z_1 - z)^2]^{\frac{1}{2}} - (d_{31} + d_{32}) = 0$$

$$[(x_2 - x)^2 + (y_2 - y)^2 + (z_1 - z)^2]^{\frac{1}{2}} +$$
$$[(x_3 - x)^2 + (y_3 - y)^2 + (z_1 - z)^2] - (d_{41} + d_{42}) = 0$$

where the specific distance $(d_{11}+d_{12})$ may be used as a sum of a distance between the light emitting device E0 and the finger OB and a distance between the finger OB and the IR sensing pixel $PX_1$, the specific distance $(d_{21}+d_{22})$ may be used as a sum of a distance between the light emitting device E0 and the finger OB and a distance between the finger OB and the IR sensing pixel $PX_2$, the specific distance $(d_{31}+d_{32})$ may be used as a sum of a distance between the light emitting device E0 and the finger OB and a distance between the finger OB and the IR sensing pixel $PX_3$, and the specific distance $(d_{41}+d_{42})$ may be used as a sum of a distance between the light emitting device E0 and the finger OB and a distance between the finger OB and the IR sensing pixel $PX_4$.

Please note that, in a case where a sensing result corresponds to a light emitting device and an IR sensing pixel which are adjacent to each other to each other (i.e. a distance between the light emitting device E0 and an IR sensing pixel may be much smaller than that between the finger OB and the IR sensing pixel), the light emitting device and the corresponding IR sensing pixel may be regarded as being located at the same position, and the above equations involved with the optical sensing apparatus 1300 may be rewritten as follows:

$$2[(x_1 - x)^2 + (y_1 - y)^2 + (z_1 - z)^2]^{\frac{1}{2}} - 2(d_{12}) = 0$$
$$2[(x_2 - x)^2 + (y_1 - y)^2 + (z_1 - z)^2]^{\frac{1}{2}} - 2(d_{22}) = 0$$
$$2[(x_1 - x)^2 + (y_2 - y)^2 + (z_1 - z)^2]^{\frac{1}{2}} - 2(d_{32}) = 0$$
$$2[(x_2 - x)^2 + (y_2 - y)^2 + (z_1 - z)^2]^{\frac{1}{2}} - 2(d_{42}) = 0$$

where the specific distances $d_{12}$ may be used as a distance between the finger OB and the IR sensing pixel $PX_1$, the specific distances $d_{22}$ may be used as a distance between the finger OB and the IR sensing pixel $PX_2$, the specific distances $d_{32}$ may be used as a distance between the finger OB and the IR sensing pixel $PX_3$, and the specific distances $d_{42}$ may be used as a distance between the finger OB and the IR sensing pixel $PX_4$. As a person skilled in the art should understand the operations of the optical sensing apparatus 1300 (having the sensing module M0) after reading the paragraphs directed to FIG. 1-FIG. 12, further description is omitted here for brevity.

Figure 14:
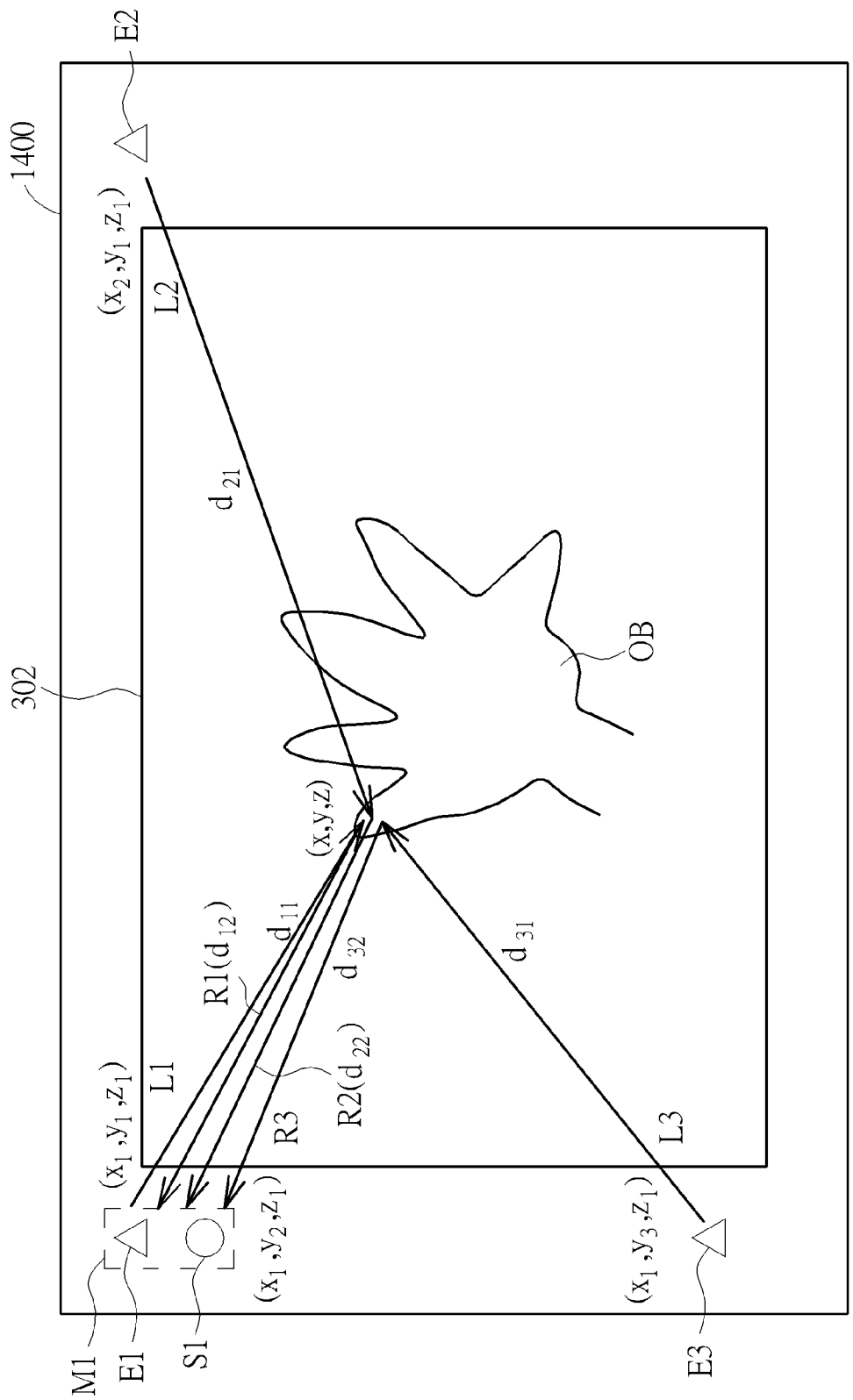
FIG. 14 is a diagram illustrating an exemplary optical sensing apparatus used for non-contact position tracking according to another embodiment of the present invention.

The proposed optical sensing apparatus may employ a single sensing device and at least three light emitting devices to realize non-contact position tracking. Please refer to FIG. 14, which is a diagram illustrating an exemplary optical sensing apparatus used for non-contact position tracking according to another embodiment of the present invention. The architecture of the optical sensing apparatus 1400 is based on that of the optical sensing apparatus 1000 shown in FIG. 10 (i.e. the optical sensing apparatus 1400 may include a plurality of IR LEDs which may define at least one geometric plane). In this embodiment, the optical sensing apparatus 1400 may include a single sensing device (i.e. the IR sensor S1), a control circuit (not shown in FIG. 14) and a processing circuit (not shown in FIG. 14), wherein the control circuit may be implemented by the control circuit 310 shown in FIG. 3, and the processing circuit may be implemented by the processing circuit 320 shown in FIG. 3. The IR sensor S1 may be arranged to detect a plurality of reflected signals R1-R3, which correspond to a plurality of IR light signals L1-L3 emitted from the IR LEDs E1-E3, respectively.

The optical sensing apparatus 1400 may employ the method shown in FIG. 2 to track a position of the finger OB. In practice, the control circuit of the optical sensing apparatus 1400 may enable the IR LEDs E1-E3 alternately according to an activation sequence, and enable the IR sensor S1 according to the activation sequence. Hence, the IR sensor S1 may detect a reflected signal reflected from the finger OB during a period in which only one IR LED is activated. Next, the processing circuit of the optical sensing apparatus 1400 may calculate the position information of the finger OB according to the emission positions of the IR LEDs E1-E3, and the sensing position of the IR sensor S1, and the sensing results generated by the IR sensor S1 in response to the IR LEDs E1-E3. For example, the processing circuit of the optical sensing apparatus 1400 may convert the sensing result of each IR sensor into a specific distance, and obtain the coordinate (x, y, z) of the finger OB from a set of equations below.

$$[(x_1 - x)^2 + (y_1 - y)^2 + (z_1 - z)^2]^{\frac{1}{2}} +$$
$$[(x_1 - x)^2 + (y_2 - y)^2 + (z_1 - z)^2]^{\frac{1}{2}} - (d_{11} + d_{12}) = 0$$
$$[(x_1 - x)^2 + (y_3 - y)^2 + (z_1 - z)^2]^{\frac{1}{2}} +$$
$$[(x_1 - x)^2 + (y_2 - y)^2 + (z_1 - z)^2]^{\frac{1}{2}} - (d_{31} + d_{32}) = 0$$
$$[(x_2 - x)^2 + (y_1 - y)^2 + (z_1 - z)^2]^{\frac{1}{2}} +$$
$$[(x_1 - x)^2 + (y_2 - y)^2 + (z_1 - z)^2]^{\frac{1}{2}} - (d_{21} + d_{22}) = 0$$

where the specific distance $(d_{11}+d_{12})$ may be used as a sum of a distance between the IR LED E1 and the finger OB and a distance between the finger OB and the IR sensor S1, the specific distance $(d_{21}+d_{22})$ may be used as a sum of a distance between the IR LED E2 and the finger OB and a distance between the finger OB and the IR sensor S1, and the specific distance $(d_{31}+d_{32})$ may be used as a sum of a distance between the IR LED E3 and the finger OB and a distance between the finger OB and the IR sensor S1.

Please note that, in a case where a sensing result corresponds to a light emitting device and an IR sensing pixel which are adjacent to each other (i.e. a distance between an IR LED and the IR sensor S1 may be much smaller than that between the finger OB and the IR sensor S1), the IR sensor and the corresponding IR LED may be regarded as being located at the same position, and the above equations involved with the optical sensing apparatus 1400 may be rewritten as follows:

$$2[(x_1 - x)^2 + (y_2 - y)^2 + (z_1 - z)^2]^{\frac{1}{2}} - 2(d_{12}) = 0$$
$$[(x_1 - x)^2 + (y_3 - y)^2 + (z_1 - z)^2]^{\frac{1}{2}} +$$
$$[(x_1 - x)^2 + (y_2 - y)^2 + (z_1 - z)^2]^{\frac{1}{2}} - (d_{31} + d_{32}) = 0$$
$$[(x_2 - x)^2 + (y_1 - y)^2 + (z_1 - z)^2]^{\frac{1}{2}} +$$
$$[(x_1 - x)^2 + (y_2 - y)^2 + (z_1 - z)^2]^{\frac{1}{2}} - (d_{21} + d_{22}) = 0$$

where the specific distance $d_{12}$ may be used as a distance between the finger OB and the IR sensor S1.

To sum up, the proposed optical sensing mechanism may use the triangulation technique to realize the non-contact position tracking, thus allowing the user to control an electronic apparatus in a non-contact manner. Additionally, the proposed optical sensing mechanism may use TDM and/or FDM to enhance the performance of the position tracking (e.g. increasing the frame rate of the sensing). Moreover, IR sensor(s) of the proposed optical sensing apparatus may be used for not only position tracking but also proximity sensing (e.g. detecting if the user holds the optical sensing apparatus, implemented by a cell phone, to the ear in a talking mode), thereby saving costs and providing auxiliary functions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensing apparatus, comprising:
   M light emitting devices, wherein M is a positive integer;
   N sensing devices, wherein N is an integer greater than or equal to 3;
   a control circuit, electrically connected to the M light emitting devices and the N sensing devices, the control circuit arranged for controlling activation and deactivation of the M light emitting devices, and controlling each sensing device to detect a reflected signal reflected from an object when a corresponding light emitting device is activated in order to generate a sensing result corresponding to the sensing device, wherein the N sensing devices generate N sensing results in response to the M light emitting devices; and
   a processing circuit, coupled to the control circuit and the N sensing devices, the processing circuit arranged for calculating position information of the object according to at least the N sensing results and N sensing positions of the N sensing devices, wherein the N sensing positions define at least one geometric plane.

2. The optical sensing apparatus of claim 1, wherein M is greater than 1, the control circuit enables the M light emitting devices according to an activation sequence, and the control circuit enables the N sensing devices alternately according to the activation sequence so that each sensing device detects a reflected signal reflected from the object during a period in which only one light emitting device is activated.

3. The optical sensing apparatus of claim 1, wherein M equals to N; each light emitting device has an emission band, and M emission bands of the M light emitting devices are different; each sensing device has a detection band, and N detection bands of the N sensing devices are different; and the M emission bands correspond to the N detection bands, respectively.

4. The optical sensing apparatus of claim 3, wherein the control circuit activates the M light emitting devices concurrently.

5. The optical sensing apparatus of claim 1, wherein each of Q sensing results of the N sensing results corresponds to a sensing device and a light emitting device which are adjacent to each other; and the processing circuit converts the Q sensing results into Q first specific distances, respectively, wherein Q is a positive integer, and each first specific distance is used as a distance between the object and a sensing device which generates a sensing result corresponding to the first specific distance.

6. The optical sensing apparatus of claim 5, wherein Q equals to N, and the processing circuit calculates the position information according to the N sensing positions and the Q first specific distances.

7. The optical sensing apparatus of claim 5, wherein Q is less than N, and each of remaining (N−Q) sensing results of the N sensing results corresponds to a sensing device and a light emitting device which are not adjacent; the processing circuit converts the (N−Q) sensing results into (N−Q) second specific distances, respectively, wherein each second specific distance is used as a sum of a distance between the object and a sensing device which generates a sensing result corresponding to the second specific distance and a distance between the object and a light emitting device which corresponds to the sensing result corresponding to the second specific distance; and the processing circuit calculates the position information according to emission positions of light emitting devices corresponding to the (N−Q) sensing results, the N sensing positions, the Q first specific distances and the (N−Q) second specific distances.

8. The optical sensing apparatus of claim 1, wherein the processing circuit converts the N sensing results into N specific distances, respectively, and calculates the position information according to M emission positions of the M light emitting devices, the N sensing positions and the N specific distances, wherein each specific distance is used as a sum of a distance between the object and a sensing device which generates a sensing result corresponding to the specific distance and a distance between the object and a light emitting device which corresponds to the sensing result corresponding to the specific distance.

9. The optical sensing apparatus of claim 1, wherein M equals to 1, and the control circuit enables the N sensing devices concurrently.

10. The optical sensing apparatus of claim 1, wherein the processing circuit further performs correction and compensation upon the position information according to a correction and compensation function.

11. An optical sensing apparatus, comprising:
M light emitting devices, wherein M is an integer greater than or equal to 3;
N sensing devices, wherein N is a positive integer;
a control circuit, electrically connected to the M light emitting devices and the N sensing devices, the control circuit arranged for controlling activation and deactivation of the M light emitting devices, and controlling each sensing device to detect a reflected signal reflected from an object when a corresponding light emitting device is activated in order to generate a sensing result corresponding to the light emitting device, wherein the N sensing devices generate M sensing results in response to the M light emitting devices, each of Q sensing results of the M sensing results corresponds to a sensing device and a light emitting device which are not adjacent, and Q is a positive integer; and
a processing circuit, coupled to the control circuit and the N sensing devices, the processing circuit arranged for calculating position information of the object according to Q emission positions of Q light emitting devices corresponding to the Q sensing results, N sensing positions of the N sensing devices and the M sensing results, wherein M emission positions of the M light emitting devices define at least one geometric plane.

12. The optical sensing apparatus of claim 11, wherein the control circuit enables the M light emitting devices alternately according to an activation sequence, and the control circuit enables the N sensing devices according to the activation sequence so that each sensing device detects a reflected signal reflected from the object during a period in which only one light emitting device is activated.

13. The optical sensing apparatus of claim 11, wherein the processing circuit converts the Q sensing results into Q first specific distances, respectively, and each first specific distance is used as a sum of a distance between the object and a sensing device which generates a sensing result corresponding to the first specific distance and a distance between the object and a light emitting device which corresponds to the sensing result corresponding to the first specific distance.

14. The optical sensing apparatus of claim 13, wherein Q equals to M, and the processing circuit calculates the position information according to the Q emission positions, the N sensing positions and the Q first specific distances.

15. The optical sensing apparatus of claim 13, wherein Q is less than M, and each of remaining (M−Q) sensing results of the M sensing results corresponds to a sensing device and a light emitting device which are adjacent to each other; the processing circuit converts the (M−Q) sensing results into (M−Q) second specific distances, respectively, wherein each second specific distance is used as a distance between the object and a sensing device which generates a sensing result corresponding to the second specific distance; and the processing circuit calculates the position information according to the Q emission positions, the N sensing positions, the Q first specific distances and the (M−Q) second specific distances.

16. The optical sensing apparatus of claim 11, wherein the processing circuit further performs correction and compensation upon the position information according to a correction and compensation function.

17. A method for detecting an object near an optical sensing apparatus, the optical sensing apparatus comprising M light emitting devices and N sensing devices, N sensing positions of the N sensing devices defining at least one geometric plane, M being a positive integer, N being a integer greater than or equal to 3, the method comprising:
enabling each sensing device to detect a reflected signal reflected from an object when a corresponding light emitting device is activated in order to generate a sensing result corresponding to the sensing device, wherein the N sensing devices generate N sensing results in response to the M light emitting devices; and
calculating position information of the object according to at least the N sensing positions and the N sensing results.

18. The method of claim 17, wherein M is greater than 1, and the method further comprises:
enabling the M light emitting devices according to an activation sequence; and
the step of enabling each sensing device to detect a reflected signal reflected from the object comprises:
enabling the N sensing devices alternately according to the activation sequence so that each sensing device detects a reflected signal reflected from the object during a period in which only one light emitting device is activated.

19. The method of claim 17, wherein M equals to N; each light emitting device has an emission band, and M emission bands of the M light emitting devices are different; each sensing device has a detection band, and N detection bands of the N sensing devices are different; the M emission bands correspond to the N detection bands, respectively; and the method further comprises:
   activating the M light emitting devices concurrently.

20. The method of claim 17, wherein each sensing result corresponds to a sensing device and a light emitting device which are adjacent to each other; and the step of calculating the position information according to at least the N sensing positions and the N sensing results comprises:
   converting the N sensing results into N specific distances, respectively, wherein each specific distance is used as a distance between the object and a sensing device which generates a sensing result corresponding to the specific distance; and
   calculating the position information according to the N sensing positions and the N specific distances.

21. The method of claim 17, wherein each of Q sensing results of the N sensing results corresponds to a sensing device and a light emitting device which are adjacent to each other, and each of remaining (N−Q) sensing results of the N sensing results corresponds to a sensing device and a light emitting device which are not adjacent; and the step of calculating the position information according to at least the N sensing positions and the N sensing results comprises:
   converting the Q sensing results into Q first specific distances, respectively, wherein each first specific distance is used as a distance between the object and a sensing device which generates a sensing result corresponding to the first specific distance;
   converting the (N−Q) sensing results into (N−Q) second specific distances, respectively, wherein each second specific distance is used as a sum of a distance between the object and a sensing device which generates a sensing result corresponding to the second specific distance and a distance between the object and a light emitting device which corresponds to the sensing result corresponding to the second specific distance; and
   calculating the position information according to emission positions of light emitting devices corresponding to the (N−Q) sensing results, the N sensing positions, the Q first specific distances and the (N−Q) second specific distances.

22. The method of claim 17, wherein the step of calculating the position information according to at least the N sensing positions and the N sensing results comprises:
   converting the N sensing results into N specific distances, respectively, wherein each specific distance is used as a sum of a distance between the object and a sensing device which generates a sensing result corresponding to the specific distance and a distance between the object and a light emitting device which corresponds to the sensing result corresponding to the specific distance; and
   calculating the position information according to M emission positions of the M light emitting devices, the N sensing positions and the N specific distances.

23. The method of claim 17, wherein M equals to 1, and the step of enabling each sensing device to detect a reflected signal reflected from the object comprises:
   enabling the N sensing devices concurrently.

24. The method of claim 17, wherein before the step of calculating the position information according to at least the N sensing positions and the N sensing results is performed, the method further comprises:
   performing a noise filtering operation upon the N sensing results.

25. The method of claim 17, further comprising:
   performing correction and compensation upon the position information according to a correction and compensation function.

26. A method for detecting an object near an optical sensing apparatus, the optical sensing apparatus comprising M light emitting devices and N sensing devices, M emission positions of the M light emitting devices defining at least one geometric plane, M being a integer greater than or equal to 3, N being a positive integer, the method comprising:
   enabling each sensing device to detect a reflected signal reflected from an object when a corresponding light emitting device is activated in order to generate a sensing result corresponding to the light emitting device, wherein the N sensing devices generate M sensing results in response to the M light emitting devices, each of Q sensing results of the M sensing results corresponds to a sensing device and a light emitting device which are not adjacent, and Q is a positive integer; and
   calculating position information of the object according to Q emission positions of Q light emitting devices corresponding to the Q sensing results, N sensing positions of the N sensing devices and the M sensing results.

27. The method of claim 26, further comprising:
enabling the M light emitting devices alternately according to an activation sequence; and
the step of enabling each sensing device to detect a reflected signal reflected from the object comprises:
   enabling the N sensing devices according to the activation sequence so that each sensing device detects a reflected signal reflected from the object during a period in which only one light emitting device is activated.

28. The method of claim 26, wherein Q equals to M, and the step of calculating the position information according to the Q emission positions, the N sensing positions and the M sensing results comprises:
   converting the Q sensing results into Q first specific distances, respectively, wherein each first specific distance is used as a sum of a distance between the object and a sensing device which generates a sensing result corresponding to the first specific distance and a distance between the object and a light emitting device which corresponds to the sensing result corresponding to the first specific distance; and
   calculating the position information according to the Q emission positions, the N sensing positions and the Q first specific distances.

29. The method of claim 26, wherein Q is less than M, and each of remaining (M−Q) sensing results of the M sensing results corresponds to a sensing device and a light emitting device which are adjacent to each other; and the step of calculating the position information according to the Q emission positions, the N sensing positions and the M sensing results comprises:
   converting the Q sensing results into Q first specific distances, respectively, wherein each first specific distance is used as a sum of a distance between the object and a sensing device which generates a sensing result corresponding to the first specific distance and a distance between the object and a light emitting device which corresponds to the sensing result corresponding to the first specific distance;

converting the (M−Q) sensing results into (M−Q) second specific distances, respectively, wherein each second specific distance is used as a distance between the object and a sensing device which generates a sensing result corresponding to the second specific distance; and calculating the position information according to the Q emission positions, the N sensing positions, the Q first specific distances and the (M−Q) second specific distances.

30. The method of claim 26, wherein before the step of calculating the position information according to the Q emission positions, the N sensing positions and the M sensing results is performed, the method further comprises:

performing a noise filtering operation upon the M sensing results.

31. The method of claim 26, further comprising:

performing correction and compensation upon the position information according to a correction and compensation function.

* * * * *